(12) United States Patent
Mebrahtom et al.

(10) Patent No.: US 12,712,742 B2
(45) Date of Patent: Aug. 18, 2026

(54) METHOD AND SYSTEM FOR SECURITY IN A VIRTUAL ENVIRONMENT

(71) Applicant: Mohamed bin Zayed University of Artificial Intelligence, Abu Dhabi (AE)

(72) Inventors: Daniel Mebrahtom, Abu Dhabi (AE); Siem Ghirmai, Abu Dhabi (AE); Aron Sbhatu, Abu Dhabi (AE); Moayad Aloqaily, Abu Dhabi (AE); Mohsen Guizani, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 223 days.

(21) Appl. No.: 18/436,700

(22) Filed: Feb. 8, 2024

(65) Prior Publication Data

US 2025/0080362 A1 Mar. 6, 2025

Related U.S. Application Data

(60) Provisional application No. 63/580,624, filed on Sep. 5, 2023.

(51) Int. Cl.
*H04L 9/32* (2006.01)
*H04L 9/00* (2022.01)

(52) U.S. Cl.
CPC .............. *H04L 9/3268* (2013.01); *H04L 9/50* (2022.05)

(58) Field of Classification Search
CPC . H04L 2209/56; H04L 9/3239; H04L 9/3247; H04L 9/3268; H04L 9/50
See application file for complete search history.

(56) References Cited

U.S. PATENT DOCUMENTS

| | | | | |
|---|---|---|---|---|
| 11,546,322 | B1 * | 1/2023 | Hardjono | H04L 67/131 |
| 2021/0398095 | A1 | 12/2021 | Mallett et al. | |
| 2023/0153614 | A1 | 5/2023 | Katz et al. | |
| 2023/0259920 | A1 | 8/2023 | Yu et al. | |
| 2023/0281606 | A1 * | 9/2023 | Jakobsson | H04L 9/50 705/67 |

OTHER PUBLICATIONS

Gupta et al. ; Metaverse Security: Issues, Challenges and a Viable ZTA Model ; MDPI electronics, 12 ; Jan. 12, 2023 ; 13 Pages.
Kurtunluoglu ; Security of Virtual Reality Authentication Methods in Metaverse: An Overview ; Sep. 14, 2022 ; 5 Pages.

* cited by examiner

*Primary Examiner* — Olugbenga O Idowu
(74) *Attorney, Agent, or Firm* — Oblon, McClelland, Maier & Neustadt, L.L.P.

(57) ABSTRACT

An architecture and operational identify management and trust method and system includes a flexible digital wallet application, an interactive virtual environment within the metaverse, and a secure backend infrastructure on a blockchain network. By integrating self-sovereign identity and blockchain technology, this extended framework aims to establish a secure and user-centric decentralized metaverse.

17 Claims, 20 Drawing Sheets

METHOD AND SYSTEM FOR SECURITY IN A VIRTUAL ENVIRONMENT

CROSS REFERENCE TO RELATED APPLICATION

The present application claims benefit of priority to U.S. Provisional Application No. 63/580,624 having a filing date of Sep. 5, 2023 which is incorporated herein by reference in its entirety.

BACKGROUND

Technical Field

A system and method for decentralized identity management in a Metaverse, and in particular incorporating blockchain technology into a metaverse environment to enable trust and security.

Description of the Related Art

The Metaverse, a term originating from Neal Stephenson's 1992 novel "Snow Crash," is defined as a combination of "meta," indicating transcendence, and "verse," short for universe. See Y. Wang, Z. Su, N. Zhang, R. Xing, D. Liu, T. H. Luan, and X. Shen, "A survey on metaverse: Fundamentals, security, and privacy," *IEEE Communications Surveys & Tutorials,* 2022. In this computer-generated virtual reality platform, users, represented by avatars resembling their physical selves, can easily and creatively interact within a digital environment that has its own distinct values and a separate, blockchain-supported economic system connected to the real world. See F.-Y. Wang, R. Qin, X. Wang, and B. Hu, "Metasocieties in metaverse: Metaeconomics and metamanagement for metaenterprises and metacities," *IEEE Transactions on Computational Social Systems*, vol. 9, no. 1, pp. 2-7, 2022. One of the core aims of the Metaverse is to facilitate meaningful social interactions, striving to minimize the distinction between users' experiences in the real and virtual domains. The progression and expansion of the Metaverse are fueled by various advanced technologies, including Blockchain, Digital Twin technology, Extended Reality (XR), Machine Learning (ML), wearable devices, and advanced communication networks such as 5G and beyond. See M. Guizani, H. Sami, A. Hammoud, M. Arafeh, M. Wazzeh, S. Arisdakessian, M. Chahoud, O. Wehbi, M. Ajaj, A. Mourad, H. Otrok et al., "The metaverse: Survey, trends, novel pipeline ecosystem & future directions," *arXiv preprint arXiv:* 2304.09240, 2023. As these technologies evolve, the Metaverse is transitioning from a conceptual stage to a more actionable and practical framework, drawing attention and investments from major tech companies around the world. In recent years, due to enhanced corporate investment and technological progress, the Metaverse has gained increasing prominence, envisaged as an interactive and immersive parallel digital space that augments the internet, allowing users to create, explore, and share their virtual experiences. See S. Mystakidis, "Metaverse-researchgate," 2022. [Online]. Available: https://doi.org/10.3390/encyclopedia2010031; and L.-H. Lee, T. Braud, P. Zhou, L. Wang, D. Xu, Z. Lin, A. Kumar, C. Bermejo, and P. Hui, "All one needs to know about metaverse: A complete survey on technological singularity, virtual ecosystem, and research agenda," *arXiv preprint arXiv:* 2110.05352, 2021.

Web3.0 represents the next phase in the Internet's evolution, aiming to decentralize the digital landscape by using technologies like blockchain and Decentralized Autonomous Organizations. See L. Cao, "Decentralized ai: Edge intelligence and smart blockchain, metaverse, web3, and desci," *IEEE Intelligent Systems*, vol. 37, no. 3, pp. 6-19, 2022. It seeks to counter centralization by tech giants, improve network security, and address misinformation. This framework is set to benefit the Metaverse by enhancing user control over personal data and promoting interoperability through decentralized systems. See Mystakidis and Lee et al. The decentralized approach removes the need for intermediaries, boosting transparency and data integrity. See S. Ghirmai, D. Mebrahtom, M. Aloqaily, M. Guizani, and M. Debbah, "Self-sovereign identity for trust and interoperability in the metaverse," *arXiv preprint arXiv:* 2303.00422, 2023; and M. Goldberg and F. Schär, "Metaverse governance: An empirical analysis of voting within decentralized autonomous organizations," *Journal of Business Research*, vol. 160, p. 113764, 2023.

Security and privacy are important considerations in the Metaverse, given the potential for identity theft, unauthorized access, and virtual asset theft. See Y. Wang et al. and A. Davis, J. Murphy, D. Owens, D. Khazanchi, and I. Zigurs, "Avatars, people, and virtual worlds: Foundations for research in metaverses," *Journal of the Association for Information Systems*, vol. 10, no. 2, p. 90-117, 2009. These challenges are amplified by the widespread collection and use of personal data. A robust security framework is essential for both ensuring user privacy and mitigating malicious attacks in the Metaverse. See Ghirmai et al. and Z. Lin, P. Xiangli, Z. Li, F. Liang, and A. Li, "Towards metaverse manufacturing: A blockchain-based trusted collaborative governance system," *The* 2022 4*th International Conference on Blockchain Technology,* 2022. The framework should facilitate user identity verification without compromising privacy. A decentralized approach can enhance security and establish greater trust. Utilizing Blockchain technology may ensure data integrity, serving as a protective layer against data breaches and theft. See Ghirmai et al. and T. R. Gadekallu, T. Huynh-The, W. Wang, G. Yenduri, P. Ranaweera, Q.-V. Pham, D. B. da Costa, and M. Liyanage, "Blockchain for the metaverse: A review," *arXiv preprint arXiv:* 2203.09738, 2022.

The blockchain can provide a powerful solution to trustworthiness in the Metaverse. See O. Bouachir, M. Aloqaily, F. Karray, and A. Elsaddik, "Ai-based blockchain for the metaverse: Approaches and challenges," in 2022 *Fourth International Conference on Blockchain Computing and Applications* (*BCCA*). IEEE, 2022, pp. 231-236. By employing blockchain technology, the Metaverse can ensure that data is tamperproof, transparent, and immutable. It also enables the secure exchange of value, such as virtual assets, without the need for intermediaries. By using blockchain technology, the Metaverse can ensure data integrity and prevent data breaches and theft. Blockchain technology can also provide a platform for decentralized identity management, which can improve privacy and prevent identity theft.

However, using blockchain with the Metaverse also presents a number of new research challenges. These challenges include scalability, interoperability, and privacy preserving data sharing. See T. Huynh-The, T. R. Gadekallu, W. Wang, G. Yenduri, P. Ranaweera, Q.-V. Pham, D. B. da Costa, and M. Liyanage, "Blockchain for the metaverse: A review," *Future Generation Computer Systems,* 2023. Scalability is a challenge, as the blockchain must be able to handle a large number of transactions. Interoperability is also a challenge, as the blockchain must be able to work with different metaverse environments. Privacy-preserving data sharing poses another challenge, as the blockchain must ensure that users have control over their personal data and that their privacy is maintained while still enabling data sharing. These challenges require new research to develop innovative solutions that can address these issues while maintaining the advantages of blockchain technology in the metaverse.

In spite of the notable advantages it offers, the Metaverse presents various security risks that require attention in order to safeguard user privacy and mitigate the potential for malicious attacks as discussed in Bouachir et al. In this literature review, we explore several studies that examine the security risks associated with using blockchain in the Metaverse and future directions.

Wang et al. presented a review of the security and privacy issues in the Metaverse and proposed a multi-layer security framework to mitigate these risks. The authors identified several potential threats, including identity theft, unauthorized access, and virtual asset theft. They proposed a multi-layer security framework that includes physical, network, and application security to ensure a secure and reliable metaverse environment.

Nguyen et al., proposes a novel blockchain-based framework called MetaChain to address the challenges of developing Metaverse applications, such as interoperability, resource demands, and security and privacy concerns. See C. T. Nguyen, D. T. Hoang, D. N. Nguyen, and E. Dutkiewicz, "Metachain: A novel blockchain-based framework for metaverse applications," in 2022 *IEEE 95th Vehicular Technology Conference*: (*VTC*2022-*Spring*). IEEE, 2022, pp. 1-5, incorporated herein by reference in its entirety. By utilizing smart contract mechanisms, MetaChain can automate complex interactions between the Metaverse Service Provider (MSP) and the Metaverse users (MUs), while a novel sharding scheme improves scalability. Additionally, the authors develop an incentive mechanism using Stackelberg game theory to reward MUs for their contributions to the Metaverse, thereby attracting more MUS and resources. The paper shows how the incentive mechanism can effectively impact MUs' behavior and resource allocation through numerical experiments.

Wei discusses the challenges faced by the traditional tourism industry and the potential for blockchain technology to address these challenges. See D. Wei, "Gemiverse: The blockchain-based professional certification and tourism platform with its own ecosystem in the metaverse," *International Journal of Geoheritage and Parks*, vol. 10, no. 2, pp. 322-336, 2022, incorporated herein by reference in its entirety. The author argues that the tourism industry urgently needs digital technology to improve the quality of service experience and storage security. In response to these challenges, Wei proposes Gemiverse, a blockchain-based professional certification and travel platform that offers specialized solutions to meet challenges and focuses on building immersive experiences. The author suggests three development stages of Gemiverse and the need to conduct scene application tests. Overall, the paragraph highlights the potential of blockchain technology to address the challenges faced by the tourism industry and provides a specific proposal for a real-world prototype development.

Ryu et al., highlights the limitations of conventional online environments for engaging in real-world activities, such as cultural and economic activities, during the COVID-19 pandemic. See J. Ryu, S. Son, J. Lee, Y. Park, and Y. Park, "Design of secure mutual authentication scheme for metaverse environments using blockchain," *Ieee Access*, vol. 10, pp. 98 944-98 958, 2022, incorporated herein by reference in its entirety. To overcome these limitations, metaverse environments using avatars have been proposed as a means to provide a more immersive experience. However, these metaverse environments are vulnerable to security threats due to communication over public channels and the management of sensitive user data by platform servers. The authors propose a system model that utilizes blockchain technology to guarantee secure communication and transparently manages user identification data in metaverse environments. They also propose a mutual authentication scheme that utilizes biometric information and Elliptic Curve Cryptography (ECC) to provide secure communication between users and MSPs and secure interactions between avatars. The proposed scheme is shown to have lower computation and communication costs and a wider range of security features than existing schemes, making it a viable option for providing secure metaverse environments.

Gai et al., discuss an overview of the Metaverse and its potential impact on digital transformations in various aspects of the physical world. See K. Gai, S. Wang, H. Zhao, Y. She, Z. Zhang, and L. Zhu, "Blockchain-based multisignature lock for uac in metaverse," *IEEE Transactions on Computational Social Systems,* 2022, incorporated herein by reference in its entirety. It highlights the importance of ubiquitous access controls (UACs) in the Metaverse to ensure security for users and data institutions. However, the wide scope of bridges available for individuals to shuttle in the virtual world also presents numerous security threats. To address these challenges, the authors propose a novel blockchain-based multisignature lock for UAC (BMSLUAC) scheme to ensure that only authorized users can access an institution's data. The proposed scheme utilizes a consortium blockchain system and abstracts user data access behaviors into transaction information to achieve full lifecycle data management and traceability. The authors verify the performance of their scheme through a series of experiments on the Hyperledger and demonstrate that the resource consumption, delay, and throughput of the proposed scheme are all within a reasonable range.

Badruddoja et al., proposes the use of AI smart contracts to secure prediction in metaverse applications through the adaptability of blockchain technology. See S. Badruddoja, R. Dantu, Y. He, M. Thompson, A. Salau, and K. Upadhyay, "Trusted ai with blockchain to empower metaverse," pp. 237-244, 2022, incorporated herein by reference in its entirety. The design aims to achieve immutable data, a tamper-proof model, and consensus-based prediction to provide a trusted immersive experience to metaverse users. The study used three AI algorithms, namely K nearest neighbor, linear regression, and artificial neural network, to test the hypothesis of securing prediction through blockchain smart contracts. The data is stored in the distributed storage of the interplanetary file system (IPFS), ensuring the integrity of the data. The smart contracts developed for predicting on-chain can load the model parameters to predict on-chain, ensuring integrity. The results show that the proposed approach can provide provenance of data, the integrity of the model, data, and prediction. The study shows that the AI smart contract design can secure prediction in metaverse applications and provide a trusted immersive experience for users.

Duan et al., discusses the metaverse, a virtual reality environment that has garnered significant attention and investment from industry but has not been scientifically guided in its development. See H. Duan, J. Li, S. Fan, Z. Lin, X. Wu, and W. Cai, "Metaverse for social good: A university campus prototype," pp. 153-161, 2021, incorporated herein by reference in its entirety. The authors propose a three-layer metaverse architecture consisting of infrastructure, interaction, and ecosystem from a macro perspective. The authors present a blockchain-driven metaverse prototype of a university campus, called CUHKSZ Metaverse, which aims to provide students with an interactive metaverse where their actions in the real world could correspondingly affect the virtual world, and vice versa. The authors highlight the key concepts of the CUHKSZ Metaverse system, including the use of Unity and Blender for 3D modeling, blockchain technology with smart contracts to support the ecosystem, and the Metaverse Viewer for users to interact with the virtual environment. They also discusses the use of ubiquitous sensing-based services, such as GPS and location-based incentives, to enhance user experiences in the metaverse.

Table I offers a structured comparison of technological features across seven studies, including a novel approach. It categorizes these features into three main domains: Backend Infrastructure, Frontend Interaction, and Security Principles. Within Backend Infrastructure, each study is evaluated based on its incorporation of Blockchain and Smart Contracts. On the frontend, the emphasis is on the utilization of Virtual Reality/Augmented Reality (VR/AR) and decentralized applications (dApps). Security Principles, a crucial component, further dissects each approach into four subcategories: Trust, Self-Sovereign Identity (SSI), Interoperability, and Cryptography. To provide a more rounded perspective, the table also includes two additional technologies—Artificial Intelligence (AI) and Digital Twin—that are increasingly relevant in contemporary research. The disclosed approach, which distinguishes itself by integrating a broad spectrum of these technologies, thereby suggesting a more comprehensive and holistic solution.

parties. The core data structures comprising Entity, Certificate, and Issuer serve as the structural backbone for the smart contract's data model. The Smart Contract, situated within this layer, governs and oversees data flow in accordance with predefined rules. Above the business layer, there exists a communication layer, followed by the top-level application layer. This application layer is where a distributed application and virtual space connect to the blockchain network during operational phases. To establish connections with the blockchain, an API web service is utilized, enabling information retrieval from the smart contract for user verification.

In one scenario, the system initiates signing requests to manage user assets, utilizing the API to send signed transactions to other nodes. Another scenario involves users interacting with the Metaverse through a head-mounted display. The system also incorporates a login function, using the API to establish web connections to the blockchain for retrieving information from the smart contract during user verification. This verification process includes obtaining the user's wallet address signature.

Another feature of the system includes a certificate retrieval logic function that gathers a signed message, issue date, and expiration date linked to a specific address. Additionally, a sign certificate logic function collaborates with the distributed application, allowing trusted entities to issue new certificates with defined expiration dates.

In a broader perspective, a decentralized Metaverse security system is designed to regulate entity access. This system includes a head-mounted display device for engaging with the Metaverse, a virtual environment within the Metaverse, and a blockchain layer with a smart contract for secure access management. Three core data structures-Entity, Certificate, and trust entity-form the backbone of the smart

TABLE 1

A COMPARATIVE ANALYSIS OF TECHNOLOGY FEATURES IN LITERATURE

| | Backend Infrastructure | | Frontend Interaction | | Security Principle | | | | Additional Technologies | |
|---|---|---|---|---|---|---|---|---|---|---|
| rticle | Blockchain | Smart Contract | VR/ AR | dApp | Trust | SSI | Inter-operability | Cryptography | AI | Digital Twin |
| Nguyen et al. | ✓ | ✓ | × | × | ✓ | × | × | ✓ | × | × |
| Wei | ✓ | ✓ | × | × | ✓ | × | × | ✓ | × | × |
| Ryu et al. | ✓ | × | × | ✓ | ✓ | × | × | ✓ | ✓ | × |
| Gai et al. | ✓ | ✓ | × | × | ✓ | × | × | ✓ | × | × |
| Badruddoja et al. | ✓ | × | ✓ | ✓ | ✓ | × | × | × | ✓ | × |
| Duan et al. | ✓ | ✓ | × | × | ✓ | × | × | × | ✓ | × |
| Proposed Approach | ✓ | ✓ | ✓ | ✓ | ✓ | ✓ | ✓ | ✓ | × | × |

Accordingly, in one aspect of the present disclosure includes a solution for a blockchain-empowered decentralized authentication schema for the Metaverse in the Web 3.0 era.

SUMMARY OF THE INVENTION

The present disclosure introduces a decentralized identity management system within a Metaverse, incorporating multiple layers to ensure seamless functionality. At its foundation lies a blockchain layer, supporting a business layer positioned above it. This business layer facilitates transaction processing through smart contracts, employing a hierarchical trust model to instill confidence among involved contract's data model. Serving as a bridge between digital identities of entities and a distributed application (dApp), the Smart Contract manages data flow based on predefined rules. The business layer, connected to the blockchain layer, processes transactions via the smart contract, employing a hierarchical trust model to instill confidence among involved parties. The communication layer, linked to the business layer, utilizes an API web service to establish web connections to the blockchain for information retrieval during user verification. At the top level, the application layer connects the distributed application (dApp) and virtual environment to the blockchain layer through the communication layer during operational phases.

In a further embodiment, A method of securely entering a metaverse environment, the method can include prompting, at a distributed application, a user to input their wallet address; transmitting the wallet address to a blockchain network: cross-referencing, in the blockchain network, the wallet address with a blockchain smart contract to verify the address: when the address is verified, prompting, at the distributed application, the user to provide a name of a verifiable claim that has been issued by a recognized authority: transmitting the verifiable claim to the metaverse environment: transmitting a signed claim from the blockchain smart contract to the metaverse environment: comparing the verifiable claim against the signed claim to determine authenticity of the claim; when the claim is authenticated, sending a message indicating success of the verification, allowing the user to enter the metaverse environment.

In a further embodiment, A non-transitory computer-readable storage medium including computer executable instructions, wherein the instructions, when executed by a computer, cause the computer to perform a method for securely entering a metaverse environment, the method can include prompting, at a distributed application, a user to input their wallet address: transmitting the wallet address to a blockchain network: cross-referencing, in the blockchain network, the wallet address with a blockchain smart contract to verify the address: when the address is verified, prompting, at the distributed application, the user to provide a name of a verifiable claim that has been issued by a recognized authority: transmitting the verifiable claim to the metaverse environment; transmitting a signed claim from the blockchain smart contract to the metaverse environment: comparing the verifiable claim against the signed claim to determine authenticity of the claim; when the claim is authenticated, sending a message indicating success of the verification, allowing the user to enter the metaverse environment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
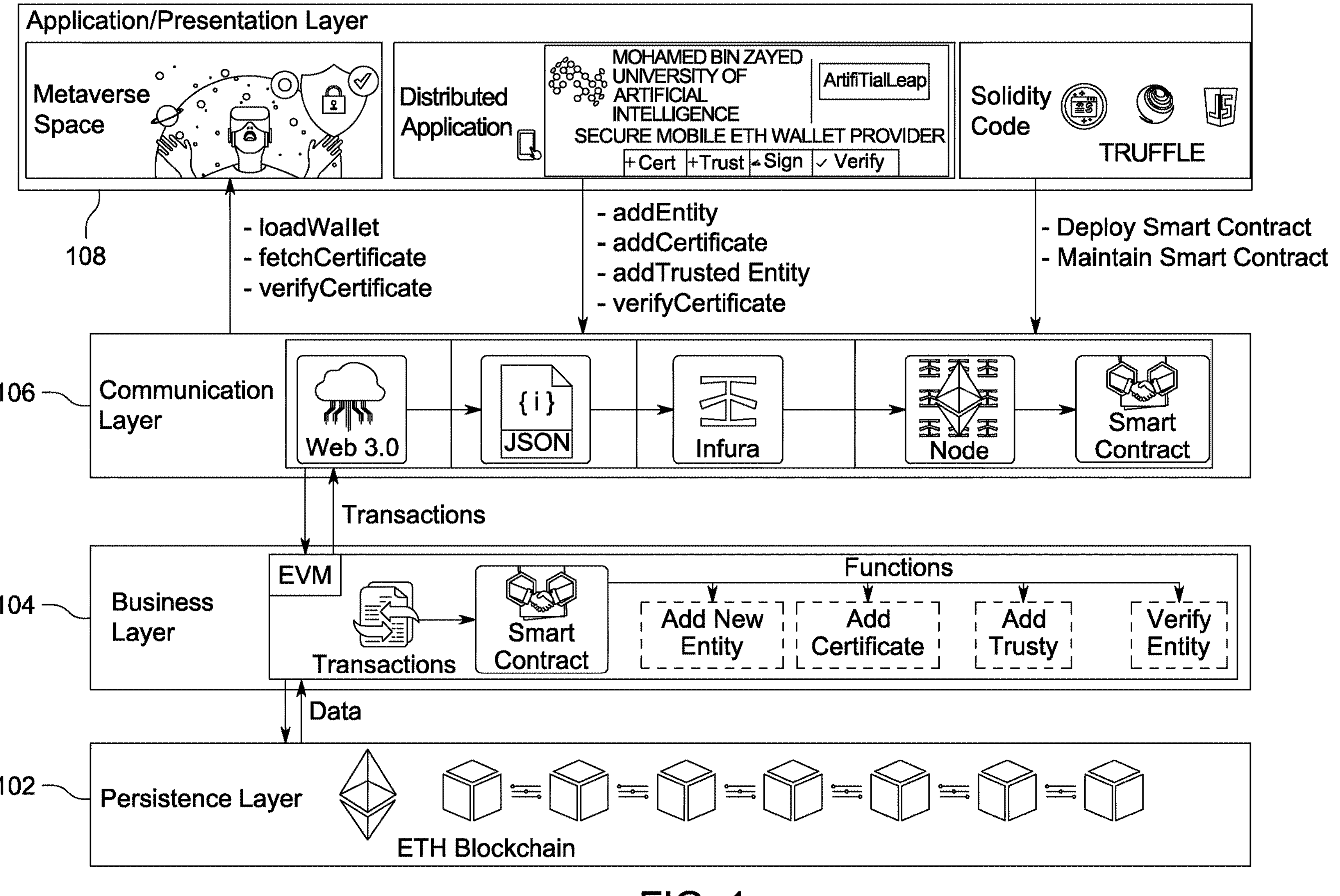
FIG. 1 illustrates a Framework of a Architecture, according to an exemplary aspect of the disclosure.

The present disclosure utilizes an SSI Management mechanism in conjunction with Web 3.0 technology to facilitate user authentication without the necessity of transmitting credentials to a central server, as detailed in the described methods and systems. One aspect encompasses a decentralized application (dApp) from a mobile wallet provider, enabling users to manage their wallet. Additionally, it includes a virtual Metaverse space that users can access upon successful authentication and a backend system integrated into the blockchain. A user-centric use case scenario delineates the steps involved in participating in the Metaverse virtual space.

Furthermore, a notable aspect pertains to the utilization of the Metaverse as a virtual reality platform for gaming, social networking, and commerce. The disclosure introduces a decentralized security mechanism that securely stores user identities in a decentralized fashion through blockchain and Web 3.0 technologies. This stands in contrast to traditional centralized identity management systems, which are more susceptible to security breaches. Another aspect involves a decentralized identity management system and smart contracts, offering users increased control over their personal information, thereby reducing the risk of data mishandling or misuse.

These aspects collectively enhance user confidence in engaging with the Metaverse, contributing to the expansion of the virtual economy. An illustrative example presented herein showcases a real-world case study demonstrating how SSI and blockchain technology enhance security within the Metaverse. The disclosed solution enhances the safety and security of interactions within the Metaverse.

I. Preliminaries

A. Self Sovereign Identity

Through the use of blockchain technology, the Self-Sovereign Identity (SSI) system enables people to fully own their digital identities. Traditional identity management registration procedures can be replaced by the decentralized and trustless database offered by SSI. In contrast to the present identity management system, which depends on big identity suppliers or makes new digital identities for each service provider, SSI enables users to live independently of services. In addition, Christopher Allen's Ten Principles of Self-Sovereign Identity, are broken down into the areas of security, controllability, and portability. See A. Mühle, A. Grüner, T. Gayvoronskaya, and C. Meinel, "A survey on essential components of a self-sovereign identity," *Computer Science Review*, vol. 30, pp. 80-86, 2018, incorporated herein by reference in its entirety. The author outlines 10 basic properties in reference, including existence, control, access, transparency, persistence, portability, interoperability, consent, minimization, and protection. See M. S. Ferdous, F. Chowdhury, and M. O. Alassafi, "In search of self-sovereign identity leveraging blockchain technology," *IEEE Access*, vol. 7, pp. 103 059-103 079, 2019, each incorporated herein by reference in its entirety. The capacity of users to use their identities anywhere they choose, regardless of whatever identity provider they choose, is a crucial component of an SSI system.

B. Blockchain and Smart Contracts

Smart contracts are automated computer programs that activate when specific conditions are met. Central to blockchain technology, they provide a secure environment for carrying out and maintaining agreements. One provider of blockchain technology is Ethereum. Ethereum is a community-run technology powering the cryptocurrency ether (ETH) and thousands of decentralized applications. Ethereum is a network of computers all over the world that follow a set of rules called the Ethereum protocol. Notably, Ethereum utilizes a Turing-complete Ethereum Virtual Machine (EVM), enabling highly customized smart contracts. Every node in the Ethereum network runs identical EVM commands, ensuring a uniform execution environment for these contracts. See W. Zou, D. Lo, P. S. Kochhar, X.-B. D. Le, X. Xia, Y. Feng, Z. Chen, and B. Xu, "Smart contract development: Challenges and opportunities," *IEEE Transactions on Software Engineering*, vol. 47, no. 10, pp. 2084-2106, 2019, incorporated herein by reference in its entirety. Recent research emphasizes their role as central facilitators for efficient and secure data and asset exchanges between disparate blockchain networks, thereby opening up new avenues for innovation and collaboration. See S. Khan, M. B. Amin, A. T. Azar, and S. Aslam, "Towards interoperable blockchains: A survey on the role of smart contracts in blockchain interoperability," *IEEE Access*, vol. 9, pp. 116 672-116 691, 2021, incorporated herein by reference in its entirety.

Ethereum uses Proof-of-Stake for consensus. In Proof-of-Stake, in order to validate transactions on the crypto network, a user only needs to show that they own a particular quantity of cryptocurrency tokens that are native to the blockchain.

A verifiable claim is defined as a piece of information that is cryptographically trustworthy. It contains all the information needed to prove that an individual hash was published in a transaction in a blockchain.

An attestation is a claim made by one entity about another entity. One approach for attestation, is to use a cryptographic proof of a claim made by an entity, usually about another entity. Attestations provide a way for an entity to make a claim that can then be verified at a later point in time.

The programmable nature of smart contracts not only ensures transactional security but also brings cost efficiency, notably reducing the need for intermediaries. This has led to the development of various decentralized applications on the Ethereum platform, from digital rights management to crowdsourcing. See S. Wang, L. Ouyang, Y. Yuan, X. Ni, X. Han, and F.-Y. Wang, "Blockchain-enabled smart contracts: architecture, applications, and future trends," *IEEE Transactions on Systems. Man, and Cybernetics: Systems*, vol. 49, no. 11, pp. 2266-2277, 2019, incorporated herein by reference in its entirety. In the emerging field of the metaverse, smart contracts automate crucial processes like asset ownership transfers and decentralized finance activities, further reducing operational costs. In summary, smart contracts serve as pivotal tools for enhancing blockchain interoperability and offer cost-efficient solutions that contribute to both the blockchain ecosystem and the metaverse.

C. Identity Theft Attack in the Metaverse

The Metaverse has privacy and security problems that leave it open to identity theft assaults. One such assault would involve taking advantage of the enormous quantity of personal information that wearable AR/VR gadgets collect, giving attackers the ability to build thorough digital profiles of people. See S.-M. Park and Y.-G. Kim, "A metaverse: Taxonomy, components, applications, and open challenges," *IEEE Access*, vol. 10, pp. 4209-4251, 2022, incorporated herein by reference in their entirety. Privacy issues are further exacerbated by users' distinct identity in the Metaverse via wearable technology that can track their physical locations. Due to the inherent qualities of the metaverse, such as its immersiveness, hyper spatiotemporality, sustainability, interoperability and scalability, and heterogeneity, current security solutions might not be adequate.

D. Elliptic Curve Cryptography in Metaverse Security

ECC serves as an invaluable asset for fortifying security in the Metaverse, especially through its signature and verification capabilities. See Z. Chen, J. Wu, W. Gan, and Z. Qi, "Metaverse security and privacy: An overview," in 2022 IEEE International Conference on Big Data (Big Data). IEEE, 2022, pp. 2950-2959, incorporated herein by reference in its entirety. ECC is designed to fend off various types of attacks, like brute force, while giving strong security with shorter key sizes. See M. Al-Zubaidie, Z. Zhang, and J. Zhang, "Efficient and secure ecdsa algorithm and its applications: A survey," *arXiv preprint arXiv:* 1902.10313, 2019, incorporated herein by reference in its entirety. Its efficient performance contributes to faster encryption and decryption processes, making it well-suited for the resource-limited and high-demand setting of the Metaverse. Moreover, ECC has inherent robustness against specific attacks like weak-curve vulnerabilities, courtesy of its utilization of Edwards curves. These traits align with the call for robust security frameworks in Metaverse networks, which include the deployment of advanced cryptographic mechanisms like ECC to address a spectrum of security risks. See A. M. Aslam, R. Chaudhary, A. Bhardwaj, I. Budhiraja, N. Kumar, and S. Zeadally, "Metaverse for 6 g and beyond: the next revolution and deployment challenges," *IEEE Internet of Things Magazine*, vol. 6, no. 1, pp. 32-39, 2023, incorporated herein by reference in its entirety. Nevertheless, due to the evolving landscape of quantum computing, ongoing scrutiny of ECC's long-term viability is crucial, along with a readiness to transition to other cryptographic methods if required.

An overall architecture is shown in FIG. 1 for Identity Management on the Metaverse. The architecture leverages a robust amalgamation of tools and technologies, primarily focusing on the domains of cryptography, decentralized applications (dApps), and immersive virtual environments. A comprehensive implementation of the architecture is provided, illuminating the functional potential of this integrated system for robust identity management within the Metaverse. In this disclosure, immersive virtual environments are computer graphical generated environments that make up the Metaverse. A user may enter one or more virtual environments after undergoing an identity verification and authorization process.

II. System Architecture and Components

Different aspects of the decentralized identity management solution are provided by describing architecture layers, as shown in FIG. 1. The cornerstone of the identity management framework is the utilization of public-private key pairs as a means of identification and authentication of users. These key pairs are generated and securely stored within the user's device during identity creation, serving as the primary instrument for authentication by both the blockchain and other users. Importantly, the Elliptic Curve Digital Signature Algorithm (ECDSA) is employed to sign messages, reinforcing the integrity and authenticity of the user-generated data. ECDSA allows anyone with the corresponding public key to verify the signature, thus providing an additional layer of security.

The public key, along with its ECDSA digital signature, is subsequently published to the blockchain via an identity management smart contract that we have developed. This enhances the reliability of the identity verification process, enabling anyone in the network to verify the authenticity of the user's claims.

In a decentralized network of accounts, where there is no central authority overseeing interactions, a hierarchical trust model is adopted to foster trust among parties. The dApps contribute to this network by publicly declaring a roster of entities or users that they deem trustworthy. This ecosystem of trust channels plays a pivotal role in determining the acceptability of a verifiable claim. Before validating the claim's authenticity using the published ECDSA-based public keys of the verifier, the trustworthiness of the claim is assessed based on these trust channels. This two-tiered approach—trustworthiness assessment followed by authenticity validation—enhances the security and reliability of the identity verification process in the framework.

As shown in FIG. 1, the Decentralized Metaverse Security mechanism integrates several technical elements, including a dApp for Self-Sovereign Identity (SSI), a verifiable claim generation system, and an Ethereum-based smart contract system for secure access management. Among software used to deploy smart contracts, Solidity is a statically-typed curly-braces programming language designed for developing smart contracts that run on the Ethereum Virtual Machine. The system is poised to be part of a comprehensive metaverse experience emphasizing identity creation and management, allowing users to oversee their personal data and digital resources on the ETH blockchain. A Metaverse space component uses various technologies, enabling communication between the mobile application, virtual environment space, and blockchain via Infura API and Web3 library, thus eliminating the need for managing a full blockchain node. Furthermore, this Metaverse environment is designed for virtual reality (VR) experiences, specifically optimized for Oculus Quest 2. The following sections delve into the specifics of these development stages.

A. Application Layer 108 Via User-Friendly Front-End

DAPP is a type of software application that runs on a decentralized network, such as Ethereum. Unlike traditional applications, dApps are distributed across a network of nodes, making them more transparent and resilient to censorship. A dApp may have several advantages and distinguishing features:

Customization and Unique Functionality: The system requires exclusive functionalities, including interaction with smart contracts.

Integration: Conventional dApps are functionally incompatible with other components of the system, such as the virtual metaverse space. Therefore, the development of a new dApp is necessary to achieve the desired integration.

Security: Security and trust are paramount in the system. Thus, developing a new dApp is essential to ensure that the system remains secure and fortified against potential attacks or vulnerabilities.

Figure 2A:
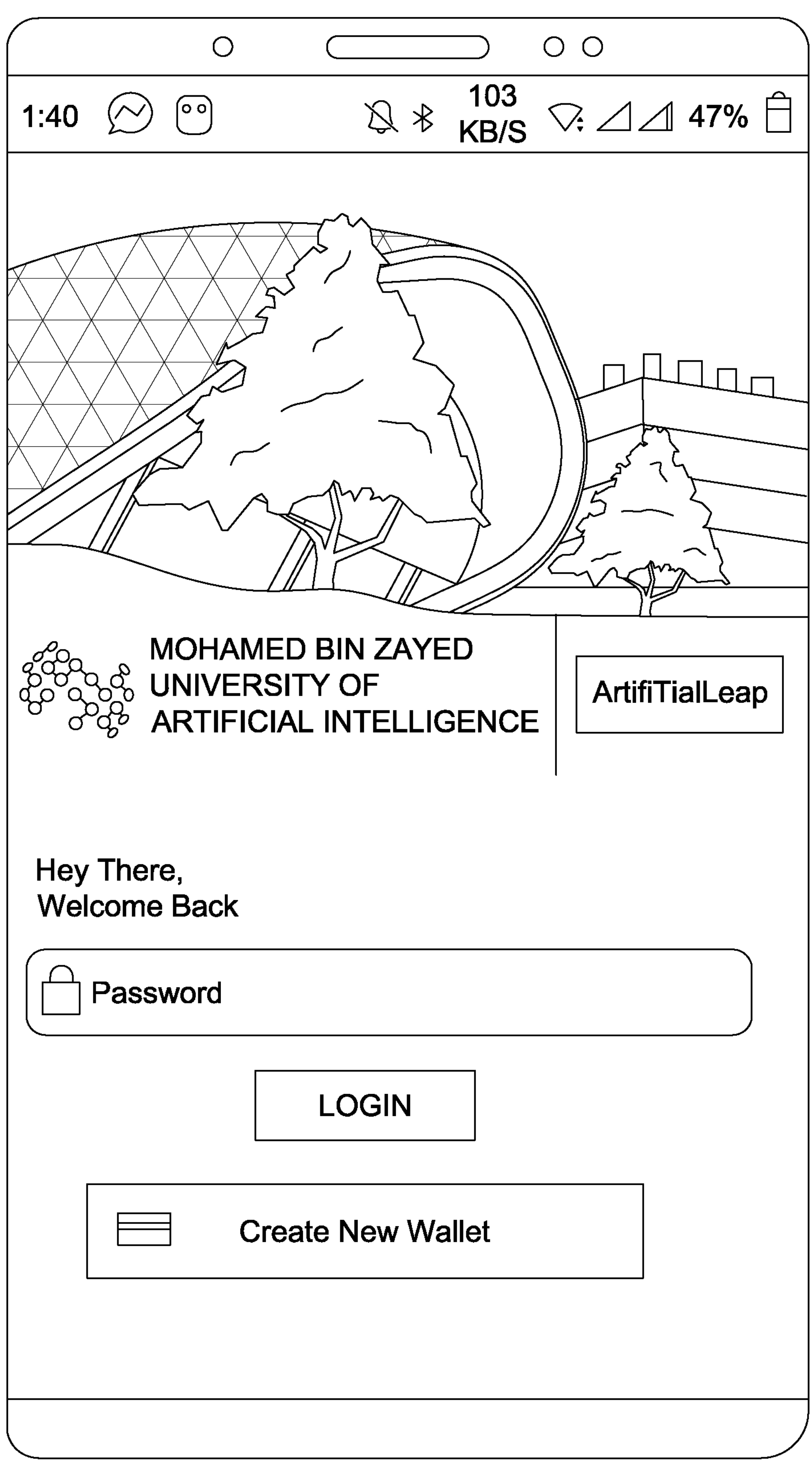
FIGS. 2A, 2B, 2C illustrates Secure Registration and Key Management for a dApp, according to an exemplary aspect of the disclosure.
Figure 2B:
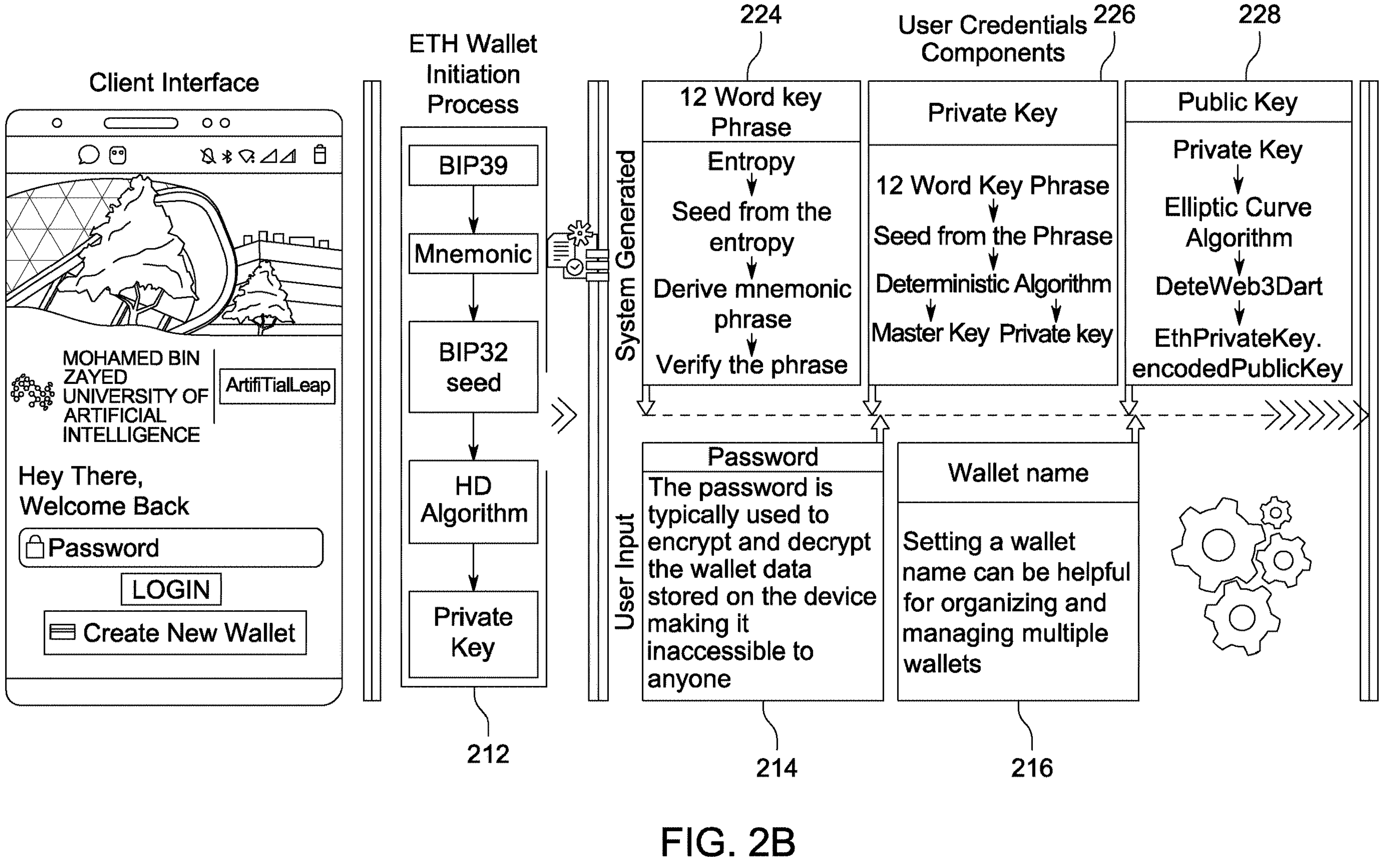

To engage with the dApp, users are required to register 212 by selecting a preferred username and providing a password 214. A unique 256-bit private key is generated for each user through Elliptic Curve Cryptography (ECC), as depicted in FIG. 2B. ECC is used for key generation, while the Elliptic Curve Digital Signature Algorithm (ECDSA) takes on the role of signing and verifying messages. Users can produce messages that encapsulate essential information, such as their wallet address. These messages are then digitally signed with the individual's private key using ECDSA, thereby offering cryptographic proof of ownership for blockchain transactions or data interactions.

Figure 2C:
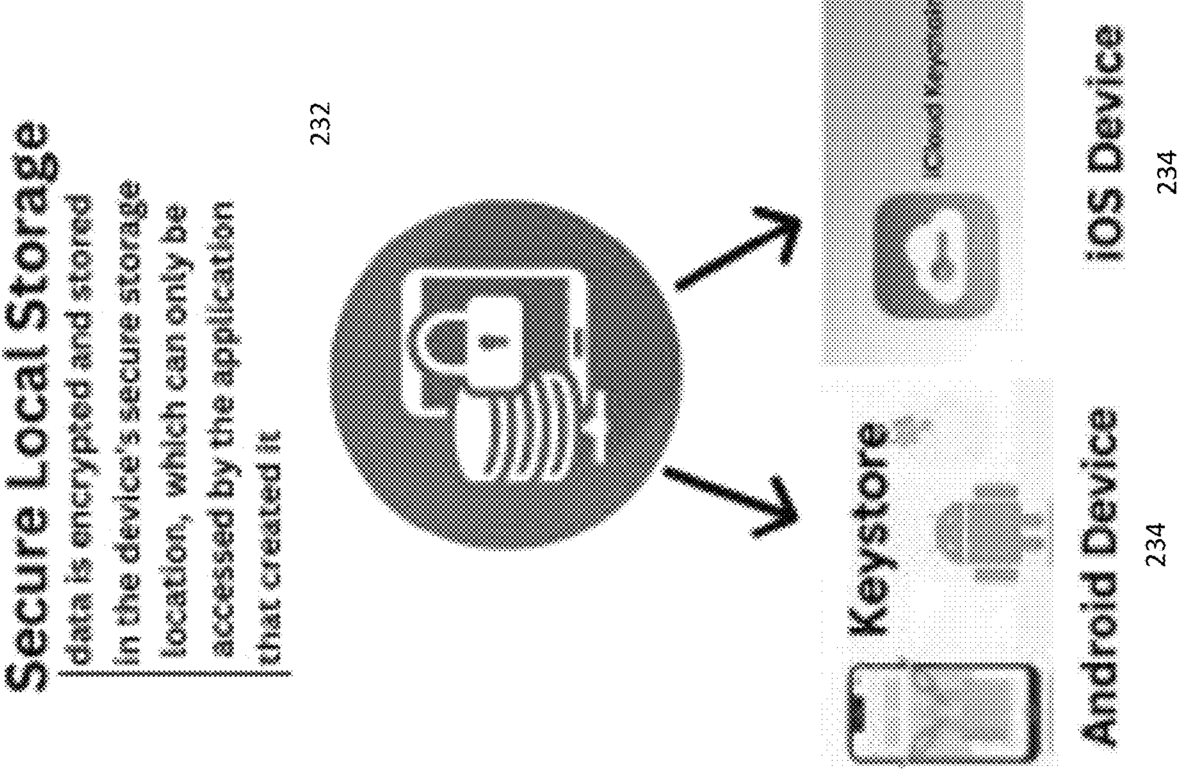

The private key 226 is derived from a seed, generated from a 12-word mnemonic phrase 224. This phrase can be used to recover a wallet's private keys and is created from a randomly generated entropy of 128 bits, offering robust security against brute-force attacks. A public key 228 is then generated from the private key, and an ETH address of 20 bytes (160 bits) is created. Each transaction made by the user is marked with this ETH address. Regarding FIG. 2C, all wallet details 232, including the password, wallet name, private key, public key, and ETH address, are encrypted and securely stored in the device's Keychain or Android Keystore 234. These storage locations are specifically designed to securely store sensitive data and can only be accessed by the application that created them.

B. Communication Layer 106 via Infura API

To seamlessly connect the DAPP and virtual space to the Ethereum Sepolia test network during its operational phase, a decision was made to utilize the Infura API web service for easy access. This avoids the intricacies of running a full node independently and still retain effective communication with the Ethereum blockchain using basic RESTful APIs. It's necessary to understand, nevertheless, that Infura is not solely responsible for transaction security. The dApp submits signing requests, which decide how to handle user assets. Infura acts as a conduit, sending your signed transactions to other nodes and miners. Considerations of privacy are intrinsically linked with security, and this is especially relevant when Infura is employed. For example, if multiple addresses are used for the purpose of privacy, it's possible that Infura could relatively easily link these addresses together. This is due to the fact that dApps typically request account balance information, and Infura can observe which Ethereum addresses are solicited from the same IP address.

One potential approach to circumvent the disclosure of account information to Infura is to manage an originating or parent node. Nevertheless, it's important to be equally cautious when interacting with blockchain explorers, as they too have the ability to correlate data in a similar fashion. The ultimate objective is to balance the functionality of dApp with the assurance of user privacy and security.

C. Presentation Layer 108 Via Immersive Metaverse Space

A secure data collection and resource management strategy is vital for users interested in engaging with a virtual environment. In one embodiment dApp is integrated to streamline the signing and sending of intricate, interlinked, and/or confidential transactional requests to blockchain-based smart contracts. This is accomplished using a variety of technologies that range from Unity Hub for game development to Blender and Revit for high-fidelity graphical modeling.

Users engage with the Metaverse space through head-mounted displays like the Oculus Quest 2. With the XR Interaction Toolkit package, an environment is constructed to facilitate interactions via the headset and Meta Quest 2 Touch controllers. This high-level component-based system provides a robust framework that efficiently translates Unity input events into 3D and UI interactions.

The Metaverse space is divided into multiple areas, the first of which serves as a 'login' space. Accessing the virtual environment of the metaverse requires users to interact with this login space and provide their public address, generated via the dApp. Web3 connections to the blockchain are established through the Infura API, which enables information retrieval from the smart contract for user verification.

Moreover, an important step in the identity verification process involves the signature of the user's wallet address. This signature is retrieved from the blockchain and verified using ECDSA and the attestor's public key. This verification process confirms that the user-provided information is authentic and ensures secure, decentralized identity management within the Metaverse. Users can then navigate through different virtual spaces based on their access level, as determined by the verified information from the blockchain.

In order to enhance user experience, the present invention incorporates Photon Pun for multiplayer communication, utilizing the Photon Unity Networking framework. This implementation ensures seamless real-time interactions in a multiplayer environment while effectively mitigating punch-through issues. Specifically designed to accommodate virtual reality (VR) experiences, the Metaverse seamlessly operates on Oculus Quest 2, with users gaining access through an APK file installable on their Head-Mounted Displays (HMDs). The system further integrates an ultra-low latency communication infrastructure, guaranteeing immediate synchronization among participants within the Metaverse.

D. Persistence Layer 102 Via Smart Contract

The Smart Contract is the cornerstone of the decentralized identity management system. Written in Solidity, it serves as the central hub connecting the Metaverse and the decentralized application (dApp), driving the operation of the entire ecosystem. The Smart Contract adopts a design with a minimal data footprint, providing a trustless, automated approach that negates the need for a centralized authority, thus bolstering system security, efficiency, and functionality.

The Smart Contract is far from a passive data store: it actively partakes in the system by executing the logic that oversees the lifecycle of entities, certificate issuance, and trust relationship establishment. One such vital function, getCertificateDetails, interfaces with the Presentation Layer in the Metaverse. It retrieves crucial details like the signed message, issuer, issue date, and expiry date of a given certificate associated with a specific address. Another important function, signCertificate, interacts directly with the dApp, enabling trusted entities to issue new certificates with defined expiry dates. Thus, the smart contract includes contract logic, as well as a data section.

Data Structure: Three core data structures—'Entity', 'Certificate', and 'Issuer'—form the backbone of the smart contract's data model. These structures serve unique roles: 'Entity' holds critical user data: 'Certificate' manages certificate-related data, including signed messages and issuer information: 'Issuer' retains details about the trusted entities. Mappings are extensively employed for efficient data retrieval, making it quick and easy to look up entities and their related information.

Contract Logic: The contract logic is materialized through meticulously designed functions that carry out specific tasks. These functions govern operations like entity registration, trust relationship establishment, and certificate management. Functions like getCertificateDetails and signCertificate play key roles in enabling secure and seamless interactions between the Metaverse, the dApp, and the Smart Contract. Rigorous access control mechanisms are implemented, permitting only authorized entities to carry out specific actions. Additionally, the smart contract provides users with full autonomy over their data management, strengthening the security and integrity of the decentralized system.

Smart Contract—Details

The Identity Management System provides various functions that can be implemented in a smart contract. A contract can be initialized through a constructor. The constructor sets a predefined name for the contract and assigns the deploying Ethereum address as the immutable owner. Entities, either individuals or organizations, can register in the Decentralized Identity Management System using an addEntity function. A deleteEntity function can be used to enable an entity to be removed from the system. An addTrustedEntity function can be used to enable entities to endorse or vouch for other entities by marking them as trusted.

The Identity Management System provides functions for management of certificates. An addCertificate function enables entities to add unsigned certificates. A signCertificate function enables trusted entities to sign and validate previously issued certificates. A removeCertificate function enables entities to remove their certificates. Other functions include getEntity Details, isEntity, and has TrustedEntities.

In particular, the Decentralized Identity Management System is constructed to provide a secure and transparent mechanism for entities to interact, trust, and verify each other in a decentralized environment. The system is initialized through the contract's constructor function, which gives it a specified name and assigns the contract's deployer as the immutable owner. This ensures that the origin and control of the system are transparently documented from inception.

Entities, which can be individuals or organizations, can join this system using the addEntity function. The entities provide their public key and a username as their unique identity. Once registered, these entities possess the capability to establish trust relationships with other entities. This trust is exemplified through the addTrustedEntity function, where one entity can designate another as 'trusted'. The ability to query whether a specific address is recognized as an entity is catered for by the isEntity function. It provides an essential checkpoint to ensure that only registered entities can engage in certain contract activities.

The functions can be used to implement a certificate management process. An entity, intending to gain access, initiates the certificate management process by adding a certificate using the addCertificate function, marking their intent, which will be further explained with respect to the Mobile Web3 DApp/Immersive Metaverse VR Functions. However, this standalone certificate doesn't establish legitimacy within the system on its own. To ensure credibility, it needs endorsements from one or more trusted entities.

These trusted entities can be anyone within the network, but they must be recognized and trusted by both the host of the Metaverse environment and the entity that originally added the certificate. The act of endorsement is realized through the signCertificate function. In this phase, each trusted entity provides their signature for the entity providing certificate, affirming the authenticity of the certificate. This process creates a robust trust web, ensuring that an entity's claim isn't just asserted by the entity itself but is also corroborated by multiple trusted parties within the network.

At any point, entities retain full authority over their certificates, encompassing the ability to delete them using the removeCertificate function.

Furthermore, the getEntityDetails function offers entities the capability to access the details of a certificate issued to them. This function has been designed with a focus on privacy, allowing only the certificate's owner to retrieve its details. As an auxiliary function, hasTrustedEntities ascertains whether an entity has garnered trust from any other entities, serving as a quick checkpoint for various system interactions.

At its core, the smart contract encompasses contractual logic governing trust dynamics within a decentralized environment. Entities within this system are not merely passive participants: they proactively initiate, validate, and authenticate trust relationships, forming a network of interconnected endorsements and validations. Leveraging the strength of decentralized consensus and the immutability inherent in blockchain technology enhances the contract's effectiveness, rendering it a resilient solution for overseeing identities and trust in a decentralized metaverse.

Mobile Web3 Dapp

Figure 3:
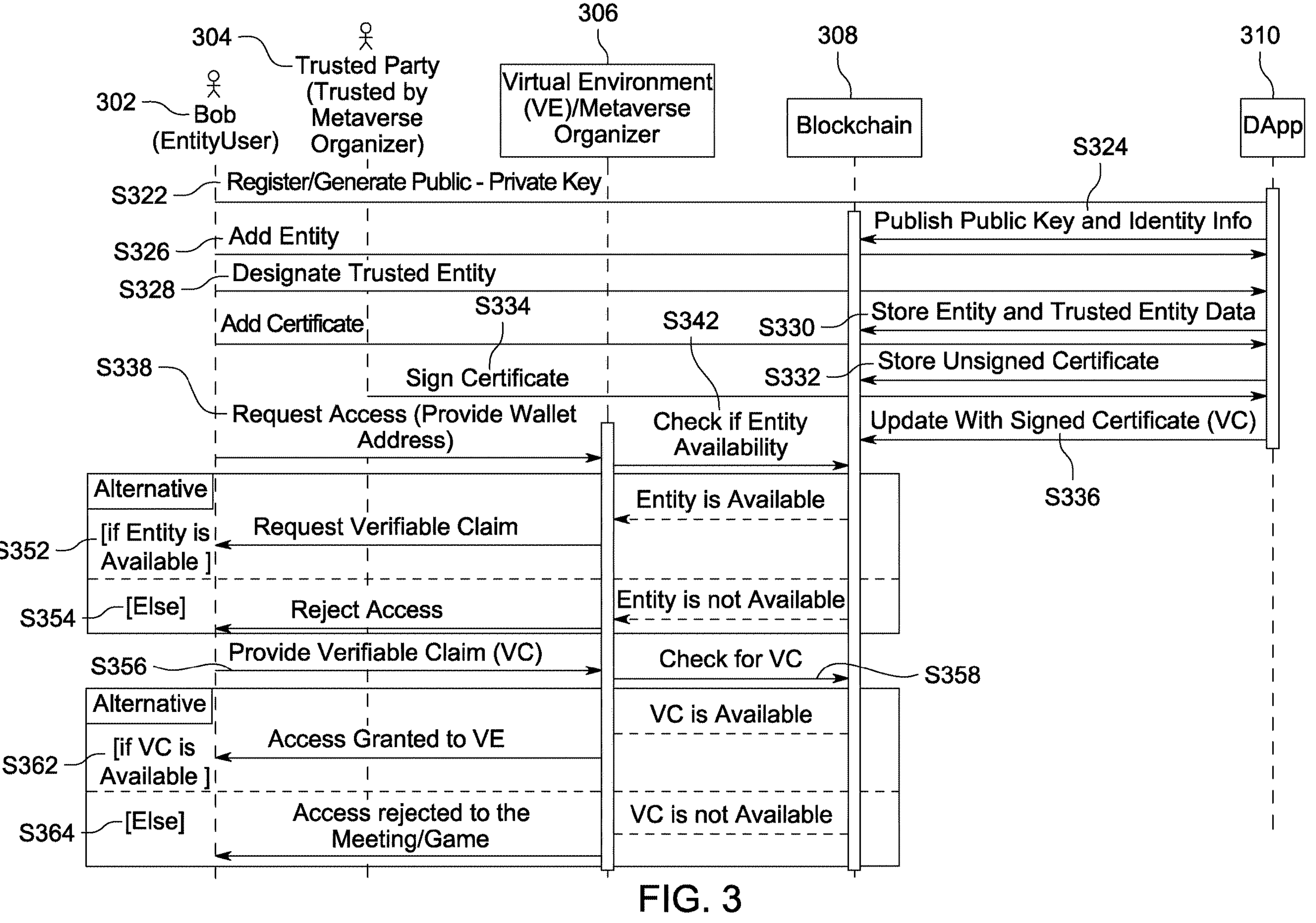
FIG. 3 is a sequence diagram for decentralized identity verification in the metaverse, according to an exemplary aspect of the disclosure, according to an exemplary aspect of the disclosure.

The Mobile Web3 dApp provides a seamless mobile interface for users to interact with the Decentralized Identity Management System. By leveraging the capabilities of Web3, the dApp facilitates various essential operations within the smart contract. FIG. 3 is a sequence diagram for decentralized identity verification in the metaverse. The following is a description of an example of how dApp accomplishes identity verification for an entity/user. FIG. 3 also includes steps that are taken for an entity/user to enter a virtual environment.

1. Entity Registration:

The functionality of the addEntity function lies in enabling the registration of a new entity within the system. In step S322, a user 302 initiates the process by providing specific details such as private and public hex values along with a username, thereby requesting inclusion in the smart contract. Moving to step S324, the dApp 310 establishes a connection with the blockchain 308 (smart contract) through an RPC URL. The blockchain 308 employs the credentials derived from the private key to ascertain the associated Ethereum address. In step S326, the dApp 310 invokes the addEntity function within the smart contract, transmitting the Ethereum Address as a parameter to complete the entity registration process.

2. Certificate Issuance:

The addCertificate function allows entities to issue new certificates. Entities provide necessary details like certificate name, description, and issue date to generate a new certificate entry. In S326, the dApp 310 first retrieves the necessary private keys. In S330, the dApp 310 connects to the blockchain using an RPC URL. The dApp 310 extracts the Ethereum address using the private key's credentials. In S328, the dApp 310 calls the addCertificate function from the smart contract, passing in the parameters required for issuing the certificate.

3. Certificate Endorsement:

Another pivotal function, signCertificate, is incorporated. In S334, this function empowers an attestor 304 to endorse or sign a certificate using the dApp 310. By interacting with the signCertificate function of the smart contract, this endorsement ensures that certificates aren't merely issued but also validated by trusted entities within the system. FIG. 3 illustrates the overall flow among the blockchain smart contract in interaction to the dApp 310.

Immersive Metaverse VR Functions

The immersive metaverse VR interface ensures a comprehensive connection between the VR environment 306 and the underlying smart contract logic 308 of the Decentralized Identity Management System. This synergy allows users to engage directly with the system's functionalities from within their immersive VR experience. The following is a detailed explanation of how the metaverse VR component 306 operates with the smart contract:

1. Entity Eligibility Check:

Before initiating any interactions tied to the decentralized identity system within the VR environment 306 (Head Mounted Display-HMD), it is imperative to ascertain if the user 302, represented by an Ethereum address, is a legitimate entity within the system. This verification is carried out using the GetEntityEligibilityFromBlockchain function.

In S342, the function queries the smart contract's isEntity function to verify the registration status of the given Ethereum address. In S352, a successful verification acknowledges the legitimacy of the entity's participation, allowing them to engage in further interactions. Conversely, a failed verification indicates the address isn't recognized within the system's records, leading to restricted VR interactions related to the identity system as stated in FIG. 3.

2. Entity Certificate Retrieval and Verification with ECDSA:

Once the system has confirmed an entity's eligibility, in S362 it proceeds to authenticate their certificate's validity. This ensures they possess the correct credentials for participating in specific VR activities or events. The verification process is fortified by the Elliptic Curve Digital Signature Algorithm (ECDSA), known for its heightened security and efficiency. ECDSA's role is to verify the integrity and origin of messages. After retrieving the necessary certificate details, the verifyAgainorNew function from HDM (Unity 3D VR) begins its rigorous verification: The expected message format, representing the certificate, is constructed.

The VerifyMessage function, leveraging ECDSA, is then called upon to verify the signed message sourced from the blockchain against this expected format, determining the certificate's authenticity and ensuring no tampering occurred as depicted in FIG. 3.

A successful ECDSA verification, evidenced by the recovered address from the signed message matching the issuer's blockchain address, confirms the certificate's legitimacy. The user is subsequently granted access, and the RoomManager assists them in joining their desired virtual environment. A confirmation message, showcasing their successful joining process and their details, is displayed by the dApp. Discrepancies or mismatches during ECDSA verification trigger a failure in the system. The entity/user is subsequently shown an error message, highlighting potential tampering or an invalid certificate. Through the integration of the ECDSA within the immersive metaverse VR interface, users' interactions in the virtual environment realm become more secure and trustworthy. By incorporating cryptographic algorithms within the metaverse, participants are assured of the authenticity and integrity of their interactions and data.

By serving as the fulcrum between the digital identities within the Metaverse and the dApp, the Smart Contract controls and regulates the data flow based on predefined rules. Its indispensable role ensures a robust, decentralized, and secure digital identity management platform.

Algorithm 1: Authorization Process System

Input: Requesting User Public key $U_{pub}$
Input: Attesting User Ethereum address $A_{ad_d}$
Input: Attestation Certificate $Cert_{A_t}$
Input: List of Users accepted as Attestors by the Virtual Service Provider VSP,
$Att_{u_{sr}} = att_1, att_2, \ldots, att_N$
Input: Fetch the Receiver's public key $Rec_{pk}$, Trusted Party's Public key $TP_{pk}$, from the SSI blockchain $SSI_B$
for $att_i$ in $Att_{user}$ do
| if $att_i$ can attest $U_{pub}$ then
| | push $Cert_{At}$
| | wait for a signed certificate $Cert_{signed}$
| ⌊ push $Cert_{signed}$ $att_i$ to $SSI_B$
⌊
if $Cert_{signed}$ then
| send Join Req to VSP Push $Cert_{signed}$, and $att_i$ to the VSP fetch Response res
| if res then
| ⌊ Connect to Virtual Space
⌊

Figure 5:
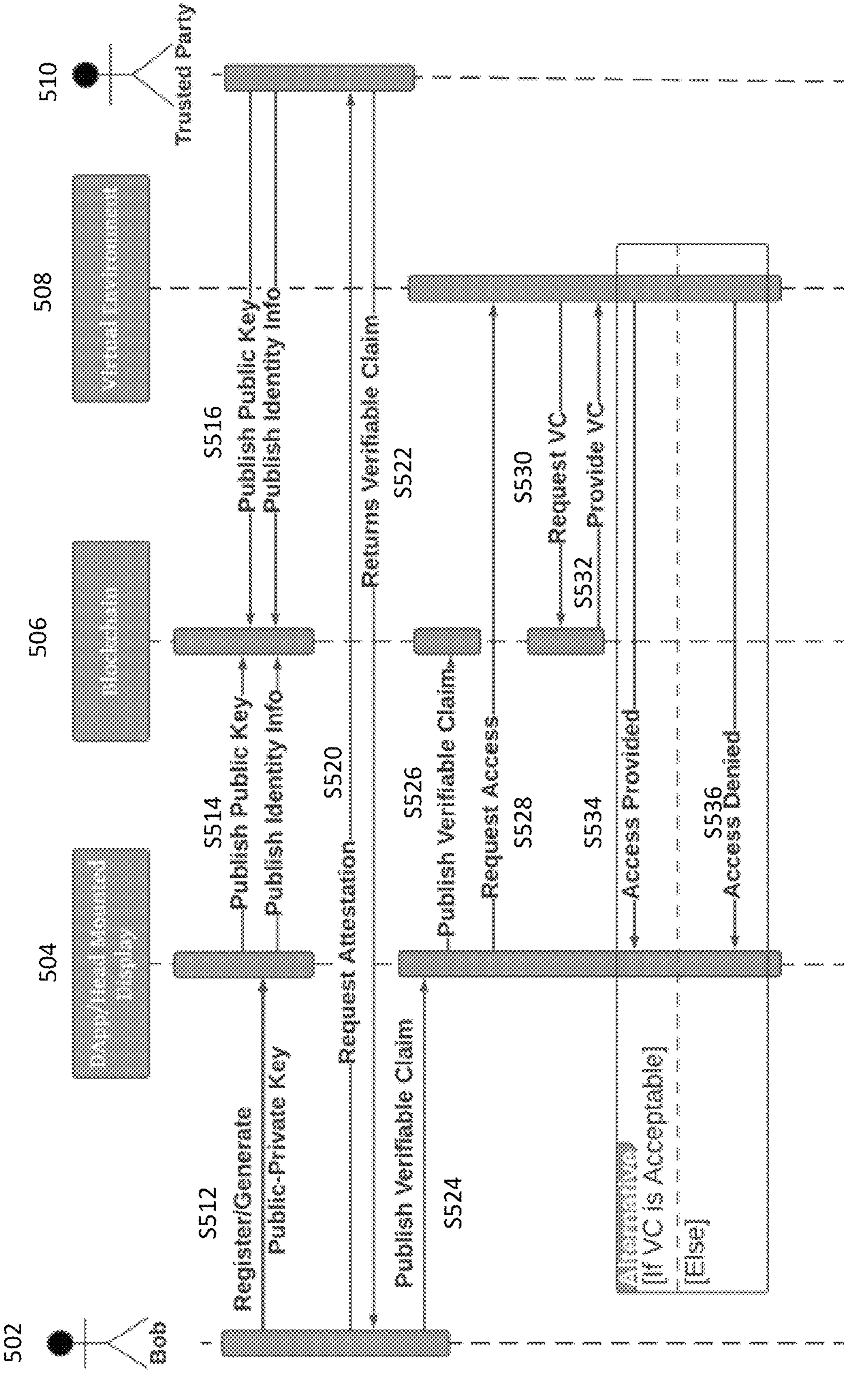
FIG. 5 is a sequence diagram of the attestation process and integration of verifiable claims in the Metaverse environment, according to an exemplary aspect of the disclosure.
Figure 6A:
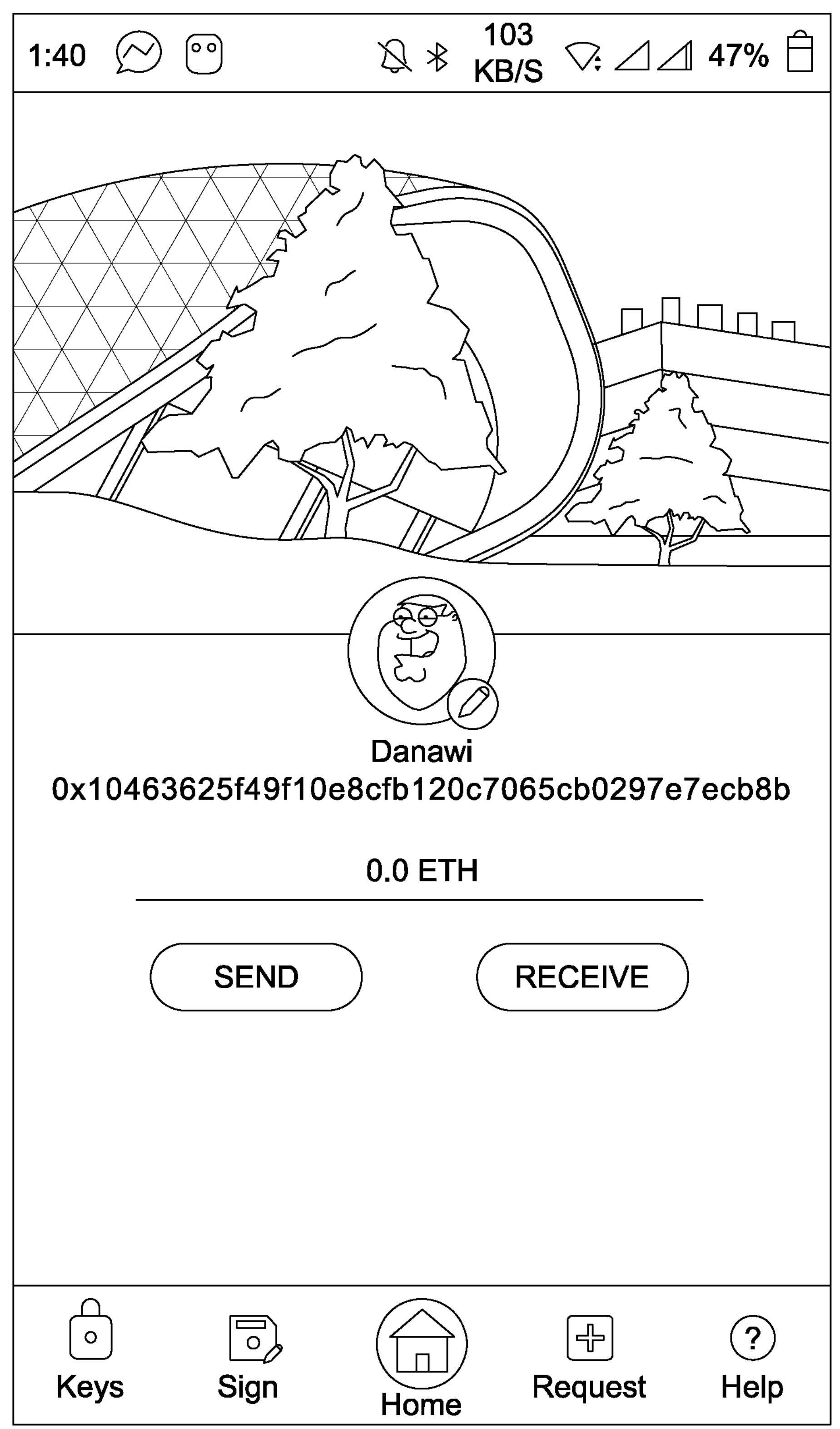
FIGS. 6A-6C illustrate a custom-made Secure Ethereum Wallet Provider, according to an exemplary aspect of the disclosure.
Figure 6B:
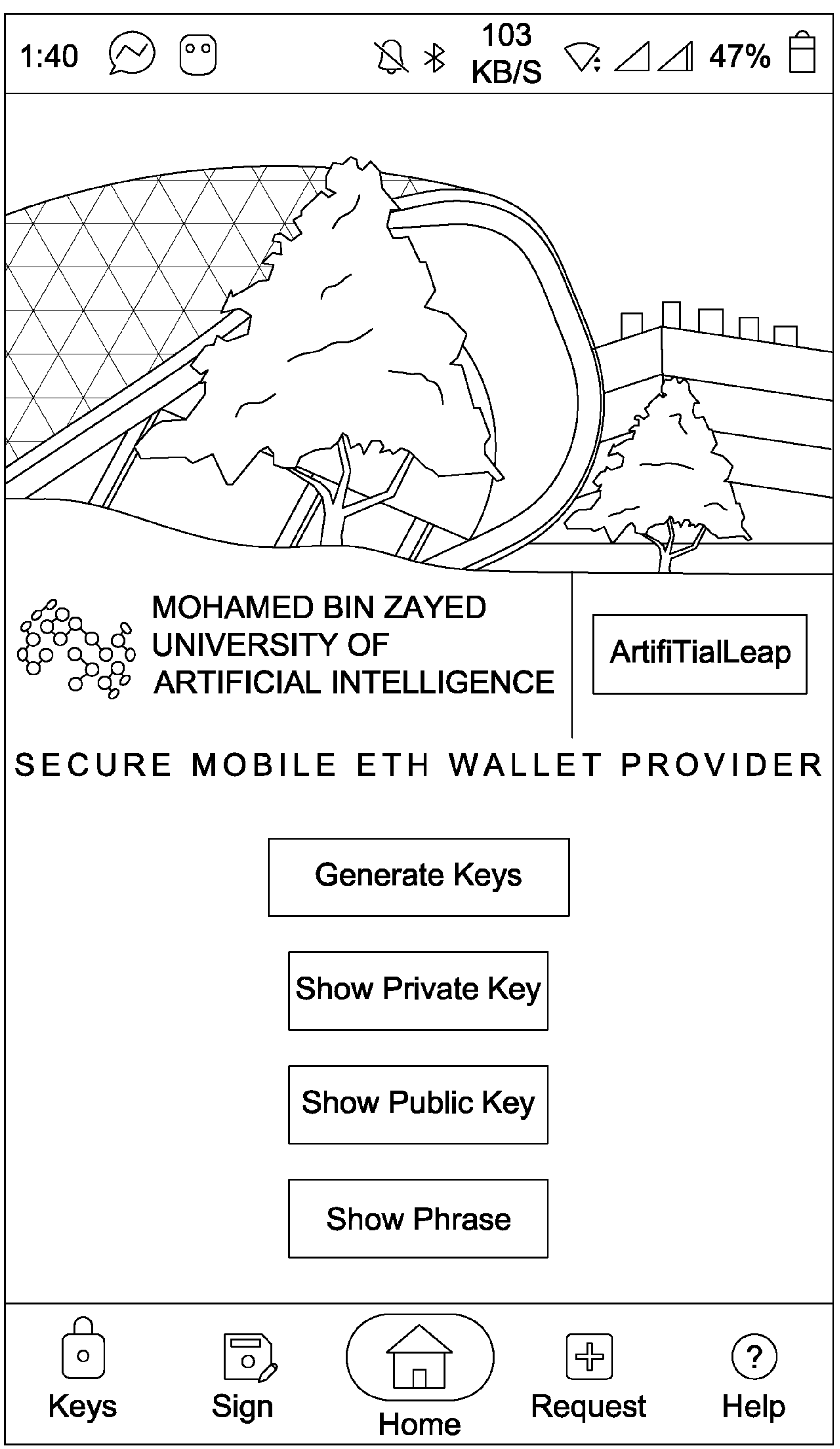
Figure 6C:
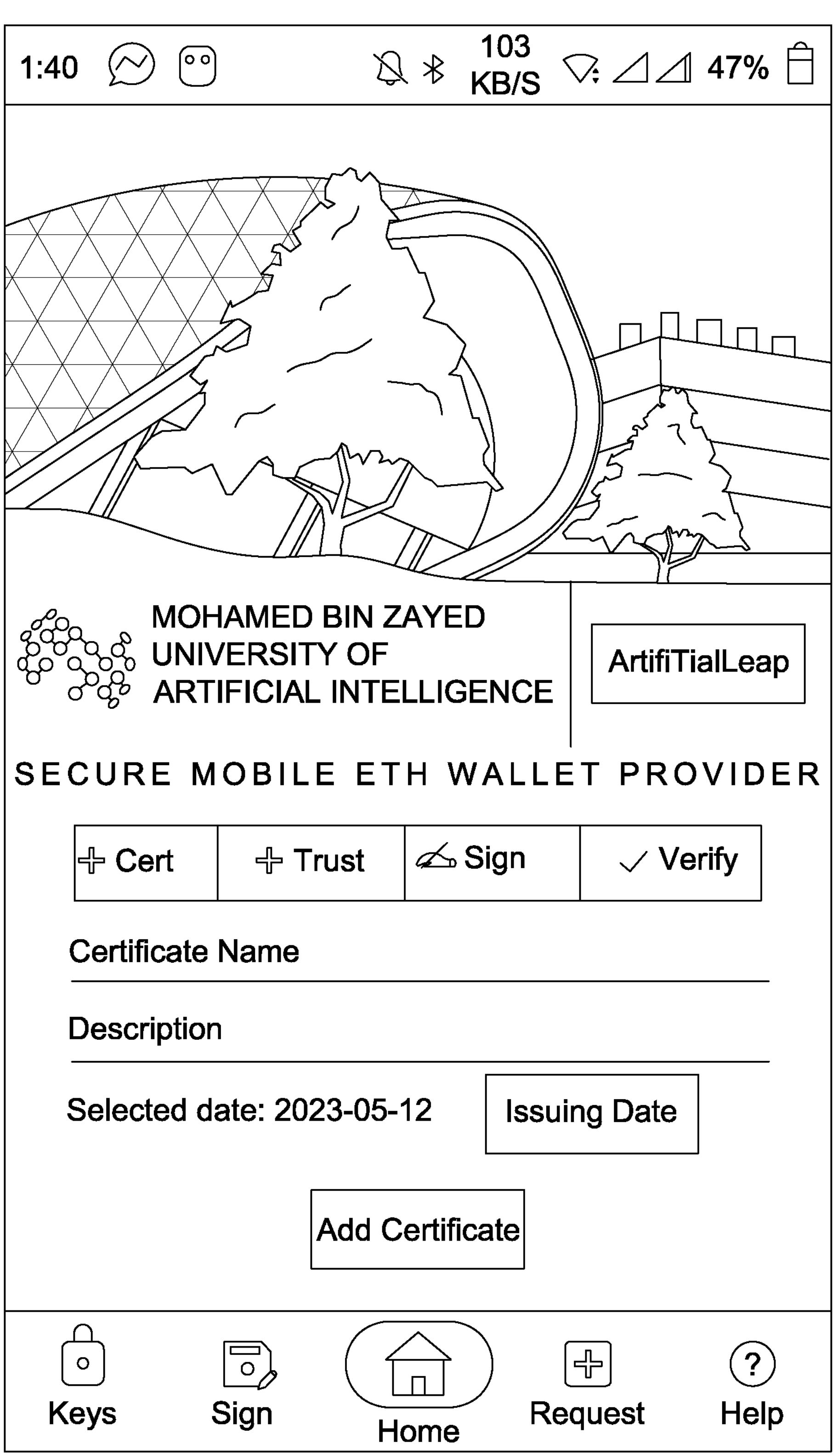

Next, in the context of the metaverse, a scenario is demonstrated with a user, "Bob". His journey begins in a decentralized application (dApp), where he forms his unique digital identity with a wallet address, as shown in FIGS. 6A, 6B, 6C. FIG. 6A illustrates an initial landing page. FIG. 6B illustrates a key generation page. As mentioned above, key pairs are generated and securely stored within the user's device during identity creation, serving as the primary instrument for authentication by both the blockchain and other users. FIG. 6C illustrates a main services page. As mentioned above, the addCertificate function allows entities to issue new certificates. The main services page in FIG. 6C is an example page where an entity provides necessary details including certificate name, description, and issue date to generate a new certificate entry. To affirm his digital identity, a trusted entity signs a certificate linked to Bob's account, securing its authenticity on the blockchain, detailed in FIG. 5.

Following these initial preparatory measures, Bob endeavors to join a Metaverse conference, thereby entering a virtual environment. The validation of his details takes place at the Metaverse Entry Gateway, where they are cross-referenced with the data recorded on the blockchain. Algorithm 1 delineates the specific steps involved in this verification process, underscoring the pivotal role played by blockchain and smart contracts in guaranteeing user identity within the metaverse. As illustrated in FIG. 5, the essential stages in Bob's progression include:

Wallet Creation: In the dApp, in S512, Bob 502 registers by providing a preferred username and password. Upon registration, a 12-word mnemonic phrase, used to recover his wallet's private keys, is automatically generated by the dApp. This wallet has a unique Ethereum (ETH) address which serves as his identifier within the blockchain-based system.

Adding a Trusted Party S520: Before adding a certificate, Bob 502 first needs to add the trusted party who he claims to be the issuer of the certificate. The trusted party is assumed to have their own wallet address already generated and stored in the blockchain.

Certificate Acquisition: Using the dApp, Bob 502 chooses to add a certificate to his account. To do so, he provides the event name and host name of the conference he wishes to attend. This data is then associated with his unique wallet address and stored on the blockchain.

Signing a Verifiable Claim S522: The trusted party 510, as the claimed issuer of the certificate, signs the certificate using the dApp. The trusted party 510 creates an encrypted message as their digital signature. This message is attached to the certificate and stored in the blockchain.

This process ensures the authenticity and validity of the certificate, making it a verifiable claim. Signing a digital certificate indicates that the Attester (trusted party 510) has confirmed the identity of the entity requesting the certificate and vouched for its authenticity.

Figure 4:
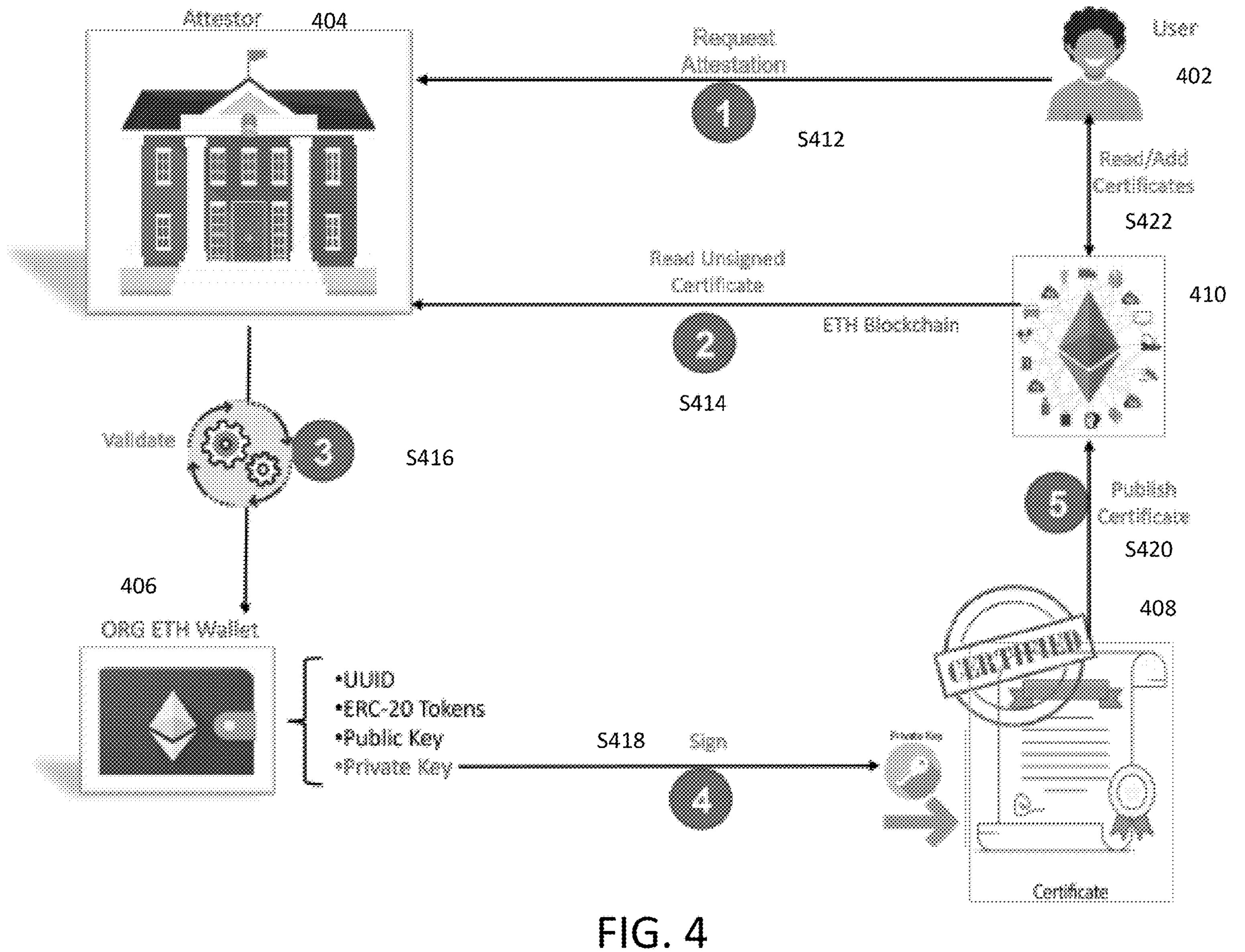
FIG. 4 is a flow diagram for attestation using smart contracts, according to an exemplary aspect of the disclosure.

FIG. 4 is a flow diagram for the process of obtaining an attestation certificate from a trusted party.

1. Request

In S412, the user requests a Trusted party/organization (Attestor 404) to sign the certificate stored in the ETH blockchain associated with his ETH wallet address. Initially, the certificate is considered as incomplete as it hasn't been attested/signed by any trusted organization.

2. Read

In S414, the trusted party (attestor 404) fetches the details of the certificate from the ETH blockchain 410 where the smart contract is deployed.

3. Validate

In S416, the trusted party (attestor 404) verifies the validity and contents of the certificate 408. This step holds paramount importance as it is crucial for building trust among the users of the system. Otherwise, the system could be compromised.

4. Sign Certificate

In S418, after careful assessment of the certificate 408, the trusted party (attestor 404) signs the certificate 408 by embedding an encrypted message using his private key 406.

5. Delivery

In S420, the certificate 408 is considered complete and attested. Now, the user 402 can use it to gain access at the event in the virtual environment.

Referring back to FIG. 5, to gain access and: With his head-mounted display on, in S528, Bob 502 initiates access to the Metaverse conference (virtual environment). To do so, he enters the event name, hostname, and his unique wallet address into the initial verification interface.

Retrieval and Validation: After Bob enters the name of the certificate, and the virtual reality headset will connect with the blockchain 506. In S530, S532, the virtual environment 508 pulls up specifics, such as the 'Signed Message' and the 'Issuer's Address' related to that specific certificate, both of which are securely stored on the blockchain 506. If the certificate name provided by Bob does not exist, in S536, he will receive a helpful error message prompting him to enter the correct one. Once this data is pulled, in S534, the user is informed but also told that the verification has not taken place yet.

Figure 7:
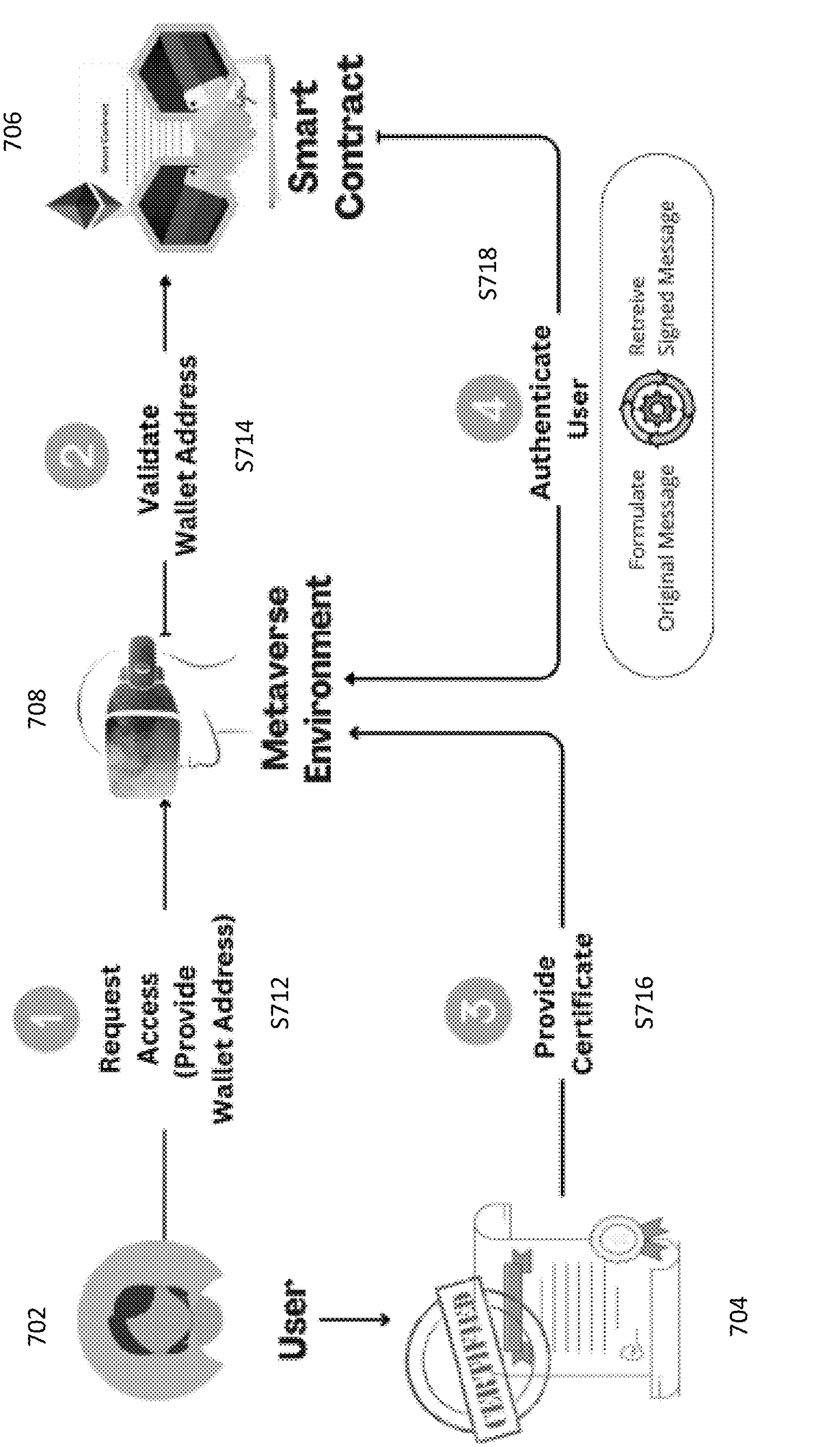
FIG. 7 illustrates the end-to-end user authentication process in the metaverse, according to an exemplary aspect of the disclosure.

Afterward, as depicted in FIG. 7 (see also sequence diagram in FIG. 3) the verification process begins, which involves a behind-the-scenes check to ensure the certificate's authenticity based on blockchain data. In this stage, the 'Signed Message' is essentially cryptographic proof that the certificate was issued by a specific address (the issuer's address). The dApp verifies whether the signed message indeed points to the issuer's address it pulled from the blockchain.

1. Address Submission

In S712, when a user 702 attempts to access the metaverse 708, they are initially prompted to provide their unique wallet address (see S338).

2. Address Verification

In S714, the provided wallet address undergoes validation in two steps: It is examined to ensure it adheres to the general format of a valid wallet address. It is cross-referenced with blockchain smart contract records to confirm the registration.

3. VC Name Input

In S716, upon successful wallet address validation, (see S356), the user 702 is then asked to provide the name of the verifiable claim, which, (see S342, S352, S354), has been previously signed and issued by a recognized authority.

4. VC Validation

In S718, utilizing the provided certificate name: (see S358) the relevant claim is sourced from the blockchain smart contract 706. The original message within the verifiable claim is juxtaposed/matched against its corresponding signed version retrieved from the blockchain, ensuring its authenticity and integrity. If it does (see S362), it means the certificate is authentic—it was issued by the claimed address. If everything matches, the user 702 receives a clear message indicating the success of the verification, allowing him entry into the conference (virtual environment). Otherwise access to the virtual environment is denied (see S364).

This scenario underlines the method of using smart contracts and blockchain technology for secure, decentralized, and privacy-preserving authentication of participants in a metaverse conference.

The implementation of the solution shows promising results in enhancing security within the Metaverse environment. From a security perspective, several key aspects are evaluated:

A. Functional Evaluation

1) User Data Protection: Storing user credentials and important details locally on the user's phone using AES symmetric encryption to ensure that sensitive information is securely stored. When data is stored, a random AES-128 (128-bit key) encryption key is generated. The data is then encrypted using this key, resulting in the ciphertext. The encryption process involves substitution, permutation, and mixing operations, with AES using S-boxes and matrix multiplications. The encryption key is securely stored on the device using platform-specific mechanisms such as the Keychain or Keystore. When retrieving data, the stored encryption key is used to decrypt the ciphertext, converting it back to plaintext. AES decryption reverses the encryption operations. This approach reduces the risk of unauthorized access to user data, as the data is not stored on centralized servers that are more susceptible to security breaches. *Cybercriminals* may attempt to gain unauthorized access using a Brute-force attack on AES encryption by trying all possible combinations of the encryption key until the correct one is found. However, the computational effort required for a brute-force attack would require 2128 attempts to crack, which is an astronomically large number and computationally infeasible to crack AES encryption by brute force.

2) Authentication and Wallet Security: The authentication and wallet security measures implemented in the decentralized metaverse solution play a crucial role in ensuring the integrity and confidentiality of user accounts and transactions. The generation of a random 12-word keyphrase and deriving the elliptic curve private key, public key, and Ethereum (ETH) address from it significantly enhances wallet security. The system generates a random 12-word keyphrase from a wordlist that consists of 2048 words. The keyphrase serves as the foundation for generating a cryptographically secure private key, which is essential for signing transactions and providing proof of ownership over digital assets. The randomness of the keyphrase ensures that private keys are not predictable or easily guessable, making it highly resistant to unauthorized access. Mathematically, the total number of possible combinations that can be formed using the wordlist is $2048^{12}$. Let's assume the attacker has the computational capacity to make one billion (1,000,000,000) attempts per second. Then the probability of cracking the keyphrase would be:

$$\text{Probability} = \frac{\text{Number of Attempts}}{\text{Total Combinations}} \tag{1}$$

This function evaluates to give the likelihood of an attacker guessing a random 12-word key phrase is approximately $2.9281631e^{-33}$. In practical terms, this probability is considered negligible and virtually impossible to crack within a reasonable timeframe using brute force methods.

B. Performance Metrics

In a manufacturing context in the Metaverse, the performance of the decentralized identity management system needs to be carefully evaluated to identify potential performance bottlenecks, especially considering the computational intensity of processing blockchain transactions and functions. In the proposed system, the backend is consolidated within a single smart contract, which serves as the backbone of the decentralized identity management system. This smart contract enables various functionalities, encompassing read, write, and ownership operations. While read operations can be performed from both the decentralized application (dApp) and the Oculus, where the Metaverse Space is hosted, it is important to note that write operations can only be executed from the dApp.

The cost of transactions is a significant consideration that necessitates careful analysis in this system. Each write transaction incurs costs in the form of gas fees, which are paid in ethers. This cost factor can potentially limit the full potential of the proposed system, as it can impact the affordability and scalability of write transactions. Conversely, reading from the blockchain does not pose such cost-related concerns. Consequently, the evaluation of the proposed system places a greater emphasis on the analysis of write transactions sent from the dApp compared to the read operations from the Oculus (Metaverse Space). By focusing on the optimization and efficiency of write transactions, including minimizing their frequency and optimizing gas usage, the evaluation seeks to address the potential cost implications and ensure the system's overall viability and cost-effectiveness.

Figure 8:
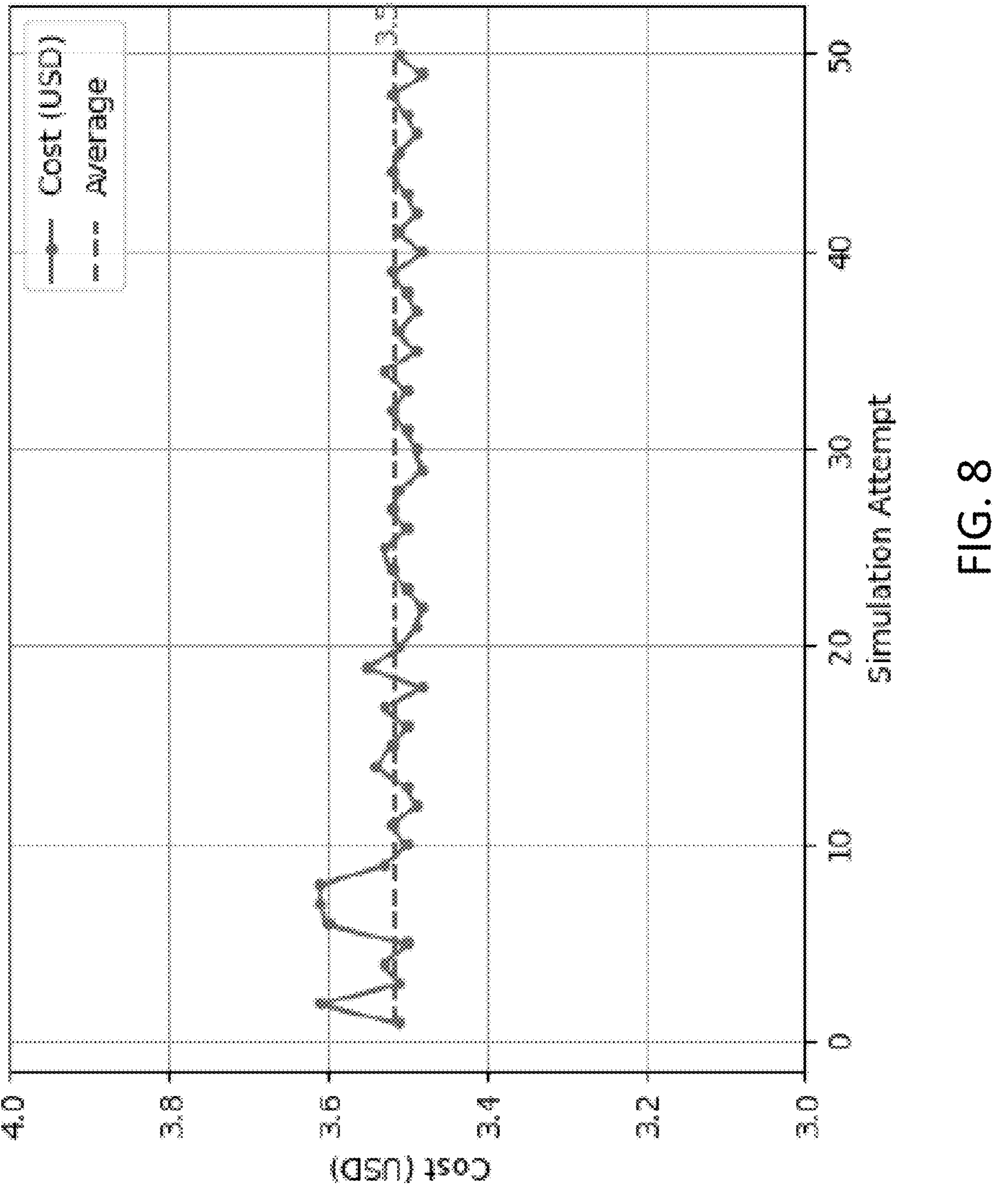
FIG. 8 depicts the analysis of deployment costs for the Smart Contract.

1) Cost of Smart Contract Deployment: The evaluation of the smart contract's deployment involved the assessment of gas fees, cost of transactions in USD, and the time required in seconds. Parameters such as the network (Sepolia), ID (11155111), block gas limit (30000000), Ethereum account, and gas fee (1 Gwei) were held constant throughout the evaluation. See M. Kuhn, F. Funk, G. Zhang, and J. Franke, "Blockchain-based application for the traceability of complex assembly structures," Journal of Manufacturing Systems, vol. 59, pp. 617-630, 2021, incorporated herein by reference in its entirety. Equation 2 presents a means to calculate the average cost of transactions in USD. As shown in FIG. 8, the cost of each transaction varied between 3.50 and 3.61 USD, with an average cost of approximately 3.51 USD. These findings indicate that the deployment process is relatively consistent and stable in terms of time and cost. However, to assess the efficiency and cost-effectiveness of the deployment process in specific use cases or performance targets, further analysis and comparison with relevant benchmarks and requirements would be necessary.

$$\text{Cost} = \left(\frac{Gasfee \times \alpha}{K}\right) \times \beta \tag{2}$$

where $\alpha$=1 Gwei, $\beta$=1,855.45 USD

K=$10^{18}$ wei

2) Cost of Transaction for the Key Functions: When evaluating the proposed decentralized security mechanism, it is imperative to give due consideration to the transaction costs associated with the most critical and frequently utilized functions, namely addCertificate, addTrustedEntity, and signCertificate. These functions hold paramount importance as they enable users to engage in essential actions such as joining the smart contract, adding verifiable claims or certificates, and incorporating trusted Ethereum addresses.

Figure 9:
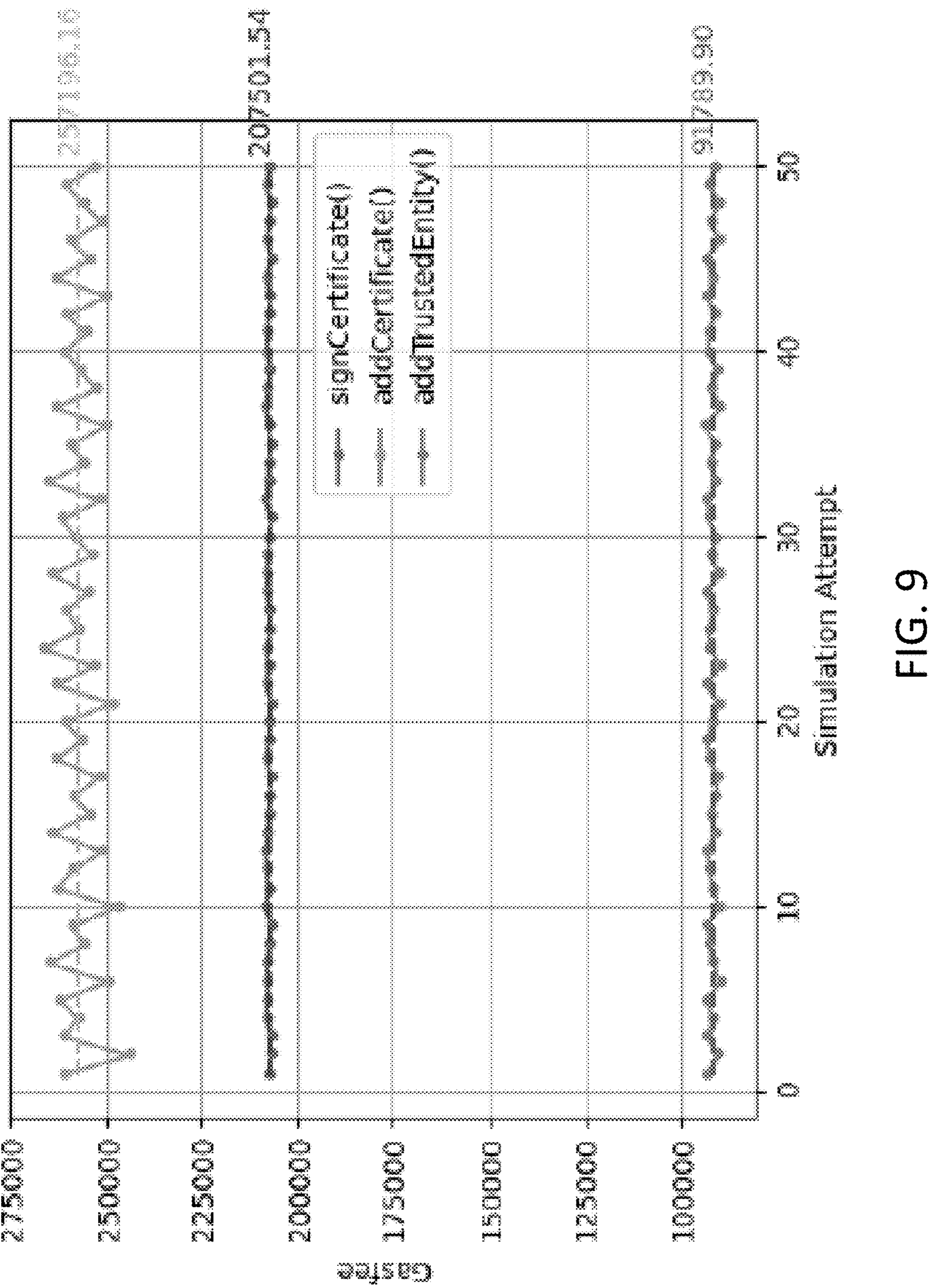
FIG. 9 presents the evaluation of costs associated with critical functions.
Figure 10A:
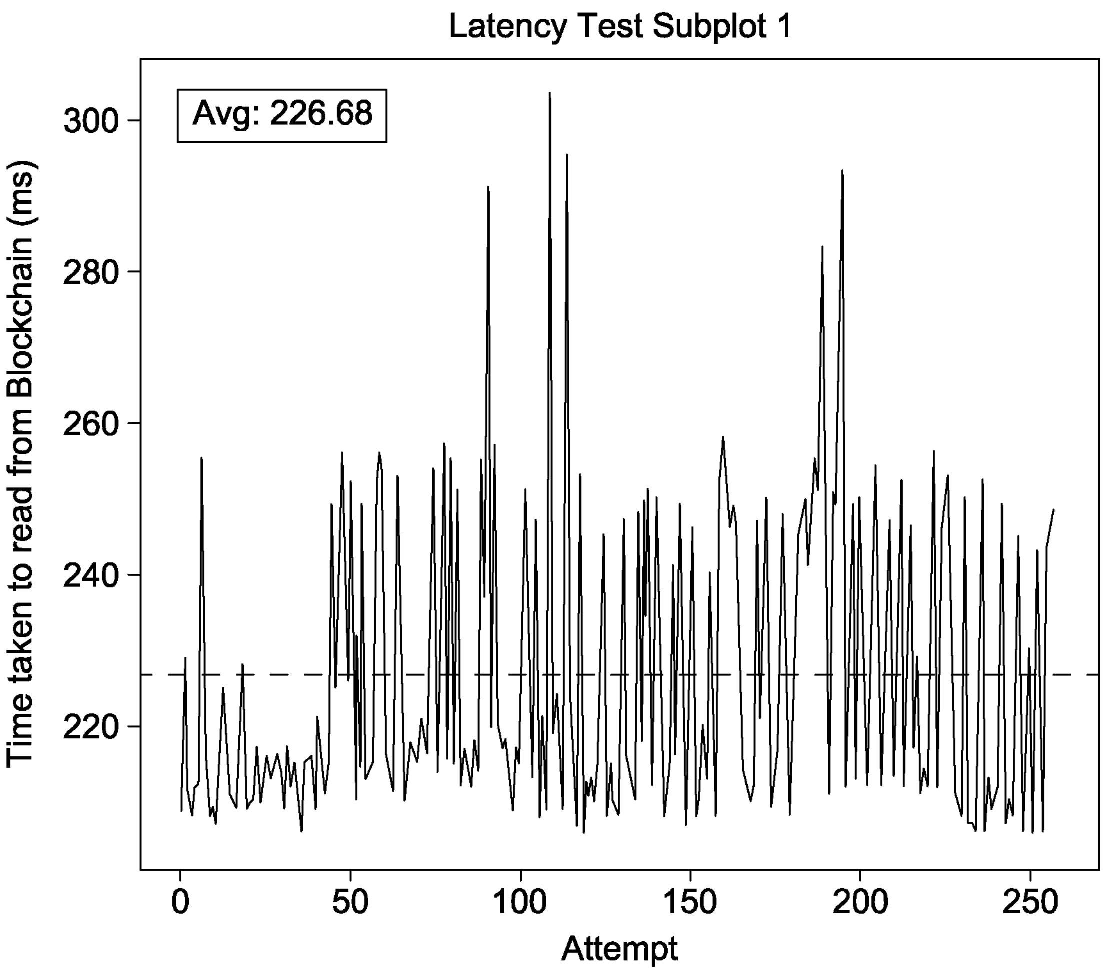
FIGS. 10A-10D illustrate the latency in data reading from the Blockchain.
Figure 10B:
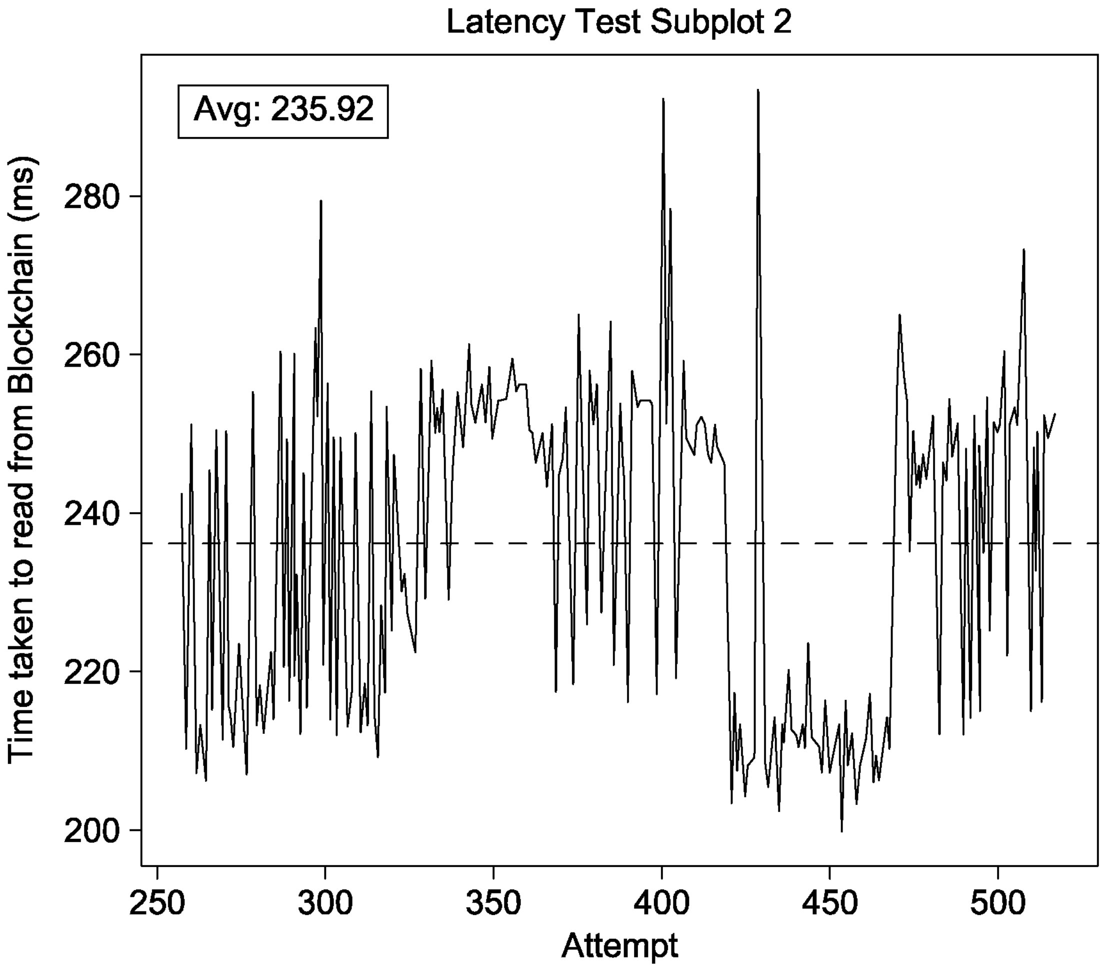
Figure 10C:
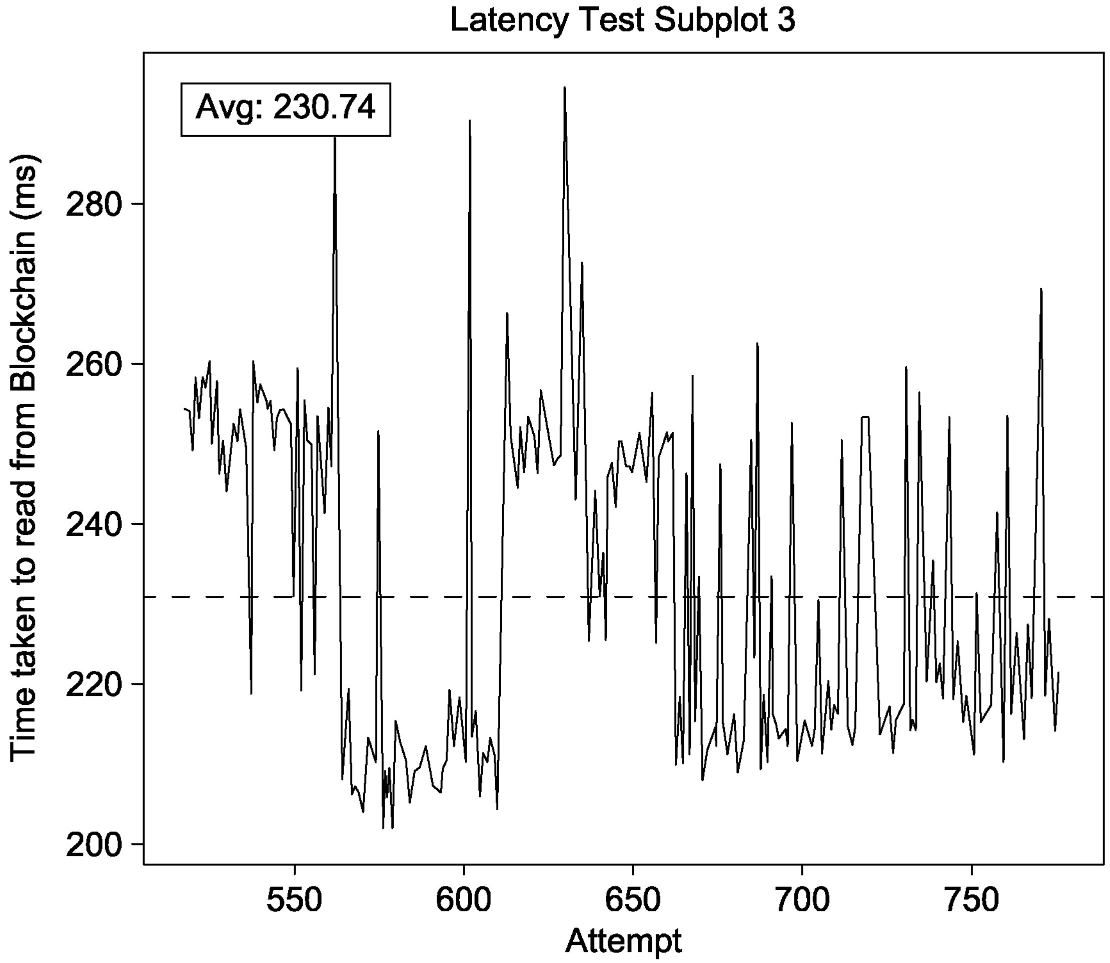
Figure 10D:
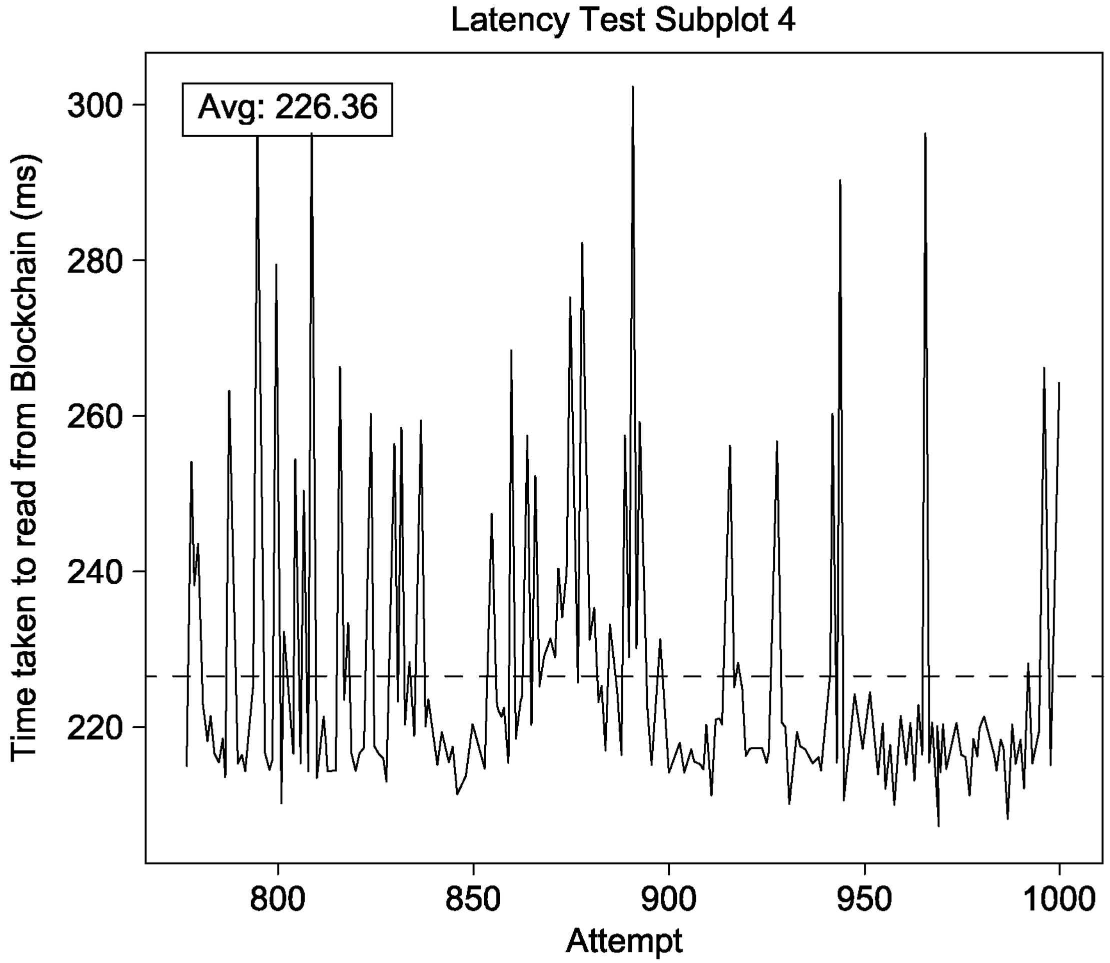

In FIG. 9 and Table II, the average cost of transactions are summarized for each key function in the system. Using equation 2, the average cost of transactions in USD is calculated for each key function. By applying this equation, one can obtain insights into the financial implications and expenditure involved in executing these functions. This would enable users to make informed decisions about their participation in the decentralized security system.

TABLE II

AVERAGE COST OF TRANSACTION FOR KEY FUNCTIONS

| Function | Average Gasfee | Average Cost (in USD) |
|---|---|---|
| signCertificate( ) | 207,501 | 0.38482 |
| addCertificate( ) | 257,196 | 0.47678 |
| addTrustedEntity( ) | 91,790 | 0.17026 |

3) Data Reading Latency from Blockchain: the time taken to read data from a blockchain network is evaluated using an Oculus HMD. As illustrated in FIGS. 10A, 10B, 10C, 10D, 3600 attempts were made, averaging approximately one attempt per second. Parameters such as network bandwidth, CPU performance, and memory were kept constant throughout the evaluation. The analysis showed that the latency for each data reading attempt was consistent, ranging from 200 to 301 milliseconds, with an average latency of about 233 milliseconds. This shows the stability of the head-mounted display when reading data from the blockchain network. In order to optimize efficiency and responsiveness for specific use cases or performance targets, it is beneficial to conduct a comprehensive analysis while considering relevant benchmarks and requirements.

The present method and system, as embodied for example in a Decentralized Metaverse Security in the Web 3.0 era, provides several advantages and features that can be utilized to obtain a single, interoperable, and open standard Metaverse. The contributions include:

Smart Contract Deployment: In an embodiment, the mobile dApp provides for the direct deployment of smart contracts from the app itself. In one embodiment, dApp interacts with smart contracts that are already deployed on the blockchain network. In one embodiment, deployment of smart contracts entails utilizing specialized development frameworks and tools like Truffle or Remix IDE. These tools provide the necessary functionality for writing, compiling, and deploying smart contracts to a blockchain network.

Scalability: Scalability is a critical concern in blockchain networks, as the number of users and transactions grows. Blockchains like Ethereum, which employ a proof-of-work consensus algorithm, face challenges with scalability due to the limited number of transactions that can be processed within each block and the time required to reach consensus. The disclosed blockchain solution provides for scalable blockchain solutions, optimizing consensus algorithms, exploring layer-two scaling approaches, or leveraging emerging blockchain technologies like sharding or proof-of-stake.

Cost of Transaction: In an embodiment, the real-world implementation of the decentralized metaverse considers the cost of each transaction. In blockchain networks, including those used in Web 3.0 technologies, transactions often incur fees to cover the computational resources and network bandwidth required for their execution and validation. These fees can vary depending on network congestion, transaction complexity, and other factors. The cost of each transaction is considered for the decentralized metaverse, particularly in the case of the potential volume of transactions within a vibrant ecosystem. In conclusion, our proposed solution for Decentralized Metaverse Security in the Web 3.0 era presents a significant step forward in enhancing security and user control within the Metaverse environment. While the solution showcases several contributions, there are challenges that need to be addressed to fully unlock the potential of a seamless, scalable, and inclusive metaverse. The challenges identified include limitations in smart contract deployment directly from the mobile dApp, scalability concerns, and the cost of transactions. These challenges pose hurdles to the flexibility, scalability, and economic viability of the decentralized metaverse. Future research and development efforts should focus on mitigating these challenges to ensure a robust and user-friendly metaverse experience.

Moreover, integrating federated learning into the decentralized metaverse system aligns with the principles of Web 3.0 models and can bring additional benefits to users. Federated learning enables the system to learn user behavior and patterns without compromising individual privacy. By distributing the learning process across multiple devices and nodes, federated learning preserves data privacy by keeping personal information local and secure. It empowers users by respecting their privacy while harnessing the collective intelligence of the Metaverse community. Leveraging federated learning, the Metaverse can offer enhanced user experiences, improved content creation, and improved resource allocation, leading to a more convenient and personalized metaverse environment. Therefore, the present disclosure contributes to the realization of a secure, scalable, and user-centric metaverse that fosters innovation, collaboration, and engagement within the Web 3.0 era.

Figure 11:
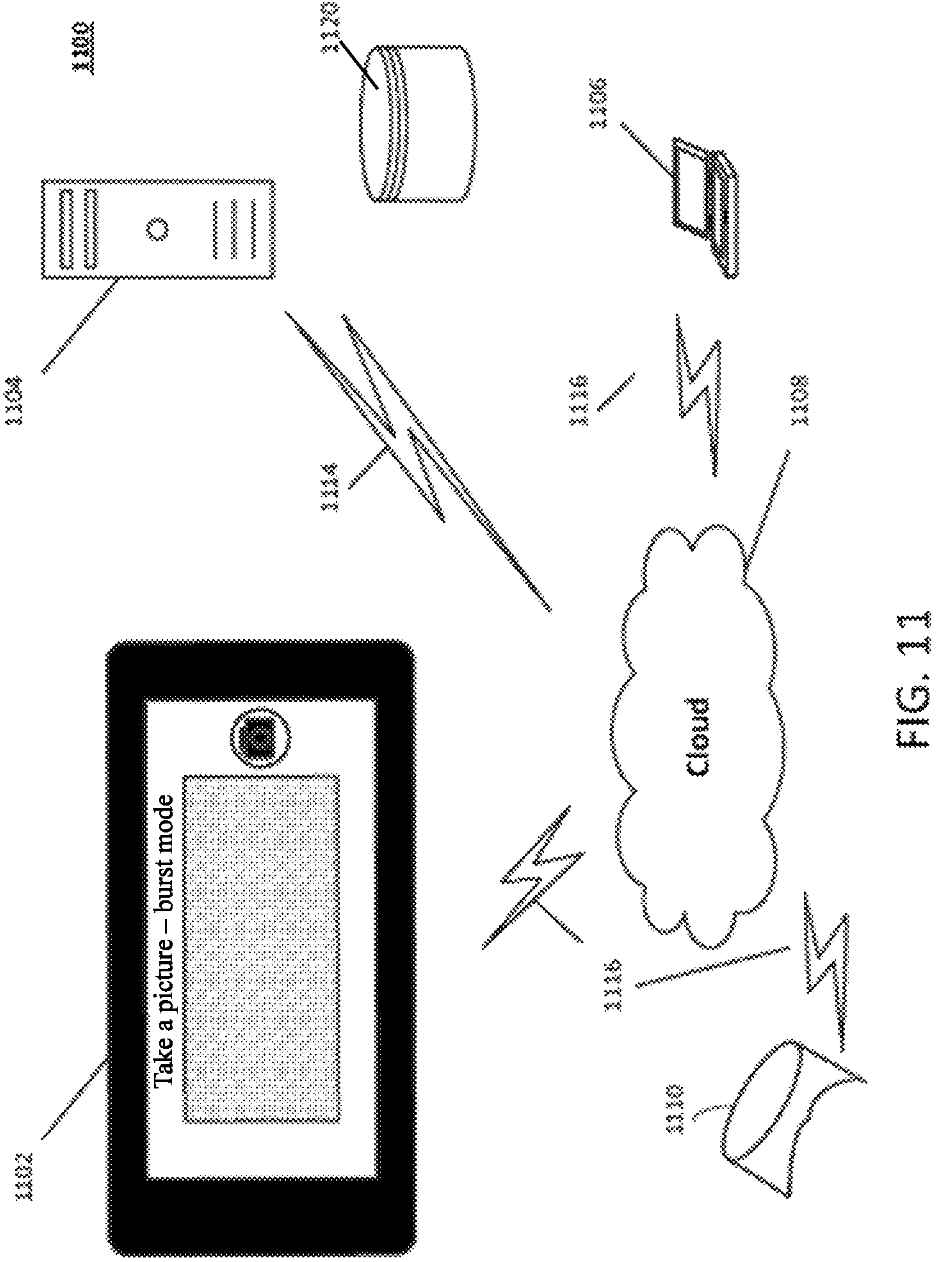
FIG. 11: Represents an exemplary scenario. aspect of the disclosure.

FIG. 11 illustrates a non-limiting distributed system. A network view 1110 of a metaverse environment typically starts with a head-mounted display device 1110. The head-mounted display device 1110 can include a virtual reality display, and can also include a transparent display for augmented reality. A mobile display device 1102 may be used to supplement the display device 1110, by displaying content that is not part of the metaverse environment, such as a distributed application that enables registration and authentication of a user and an attestor. A computing device, such as a laptop computer or workstation 1106, may perform blockchain computations, as well as offer an alternative interface to the metaverse environment. Other external servers 1104 and databases 1120 may provide specific services including map services, weather services, news services, to name a few. Each of these resources may be interconnected by way of communication links 114, 116 with the Internet 1108.

Figure 12:
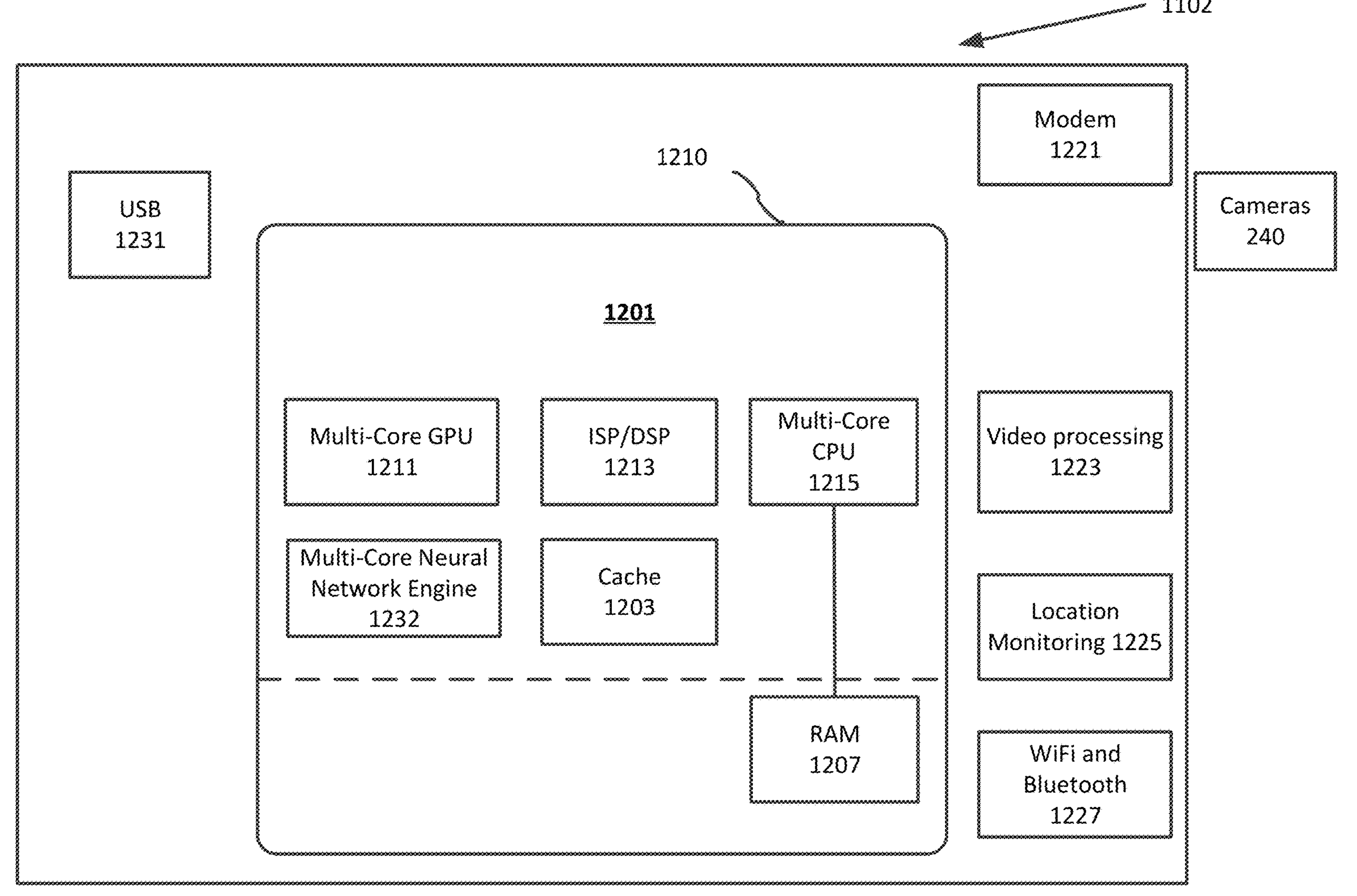
FIG. 12 is a block diagram of a mobile display device 1102 for use in the distributed system.

FIG. 12 is a block diagram of a mobile display device 1102 for use in the distributed system. FIG. 12 is a block diagram of a display processing system for the human machine interface in accordance with an exemplary aspect of the disclosure. The display processing system 1201 provides support for simultaneous camera sensor inputs, video decoding and playback, location services, wireless communications, and cellular services. The display processing system 1201 includes a central processing unit (CPU) 1215, and may include a graphics processing unit (GPU) 1211 and a digital signal processor (DSP) 1213. The CPU 1215 may include a memory, which may be any of several types of volatile memory 1207, including RAM, SDRAM, DDR SDRAM, to name a few. The DSP 1213 may include one or more dedicated caches 1203 in order to perform computer vision functions as well as machine learning functions. The GPU 1211 performs graphics processing for a 4K resolution display device. The GPU 1211, DSP 1213, CPU 1215, Cache 1203, and in some embodiments, a cellular modem 1221, may all be contained in a single system-on-chip (SOC) 1201. The display processing system 1201 may also include video processing circuitry 1223 for video decoding and playback, location service circuitry 1225, including GPS and dead reckoning, and connectivity service circuitry 1227, including WiFi and Bluetooth. The display processing system 1201 may include one or more input/output ports, including USB connector(s) 1231, such as connectors for USB 2, USB 3, etc.

Figure 13:
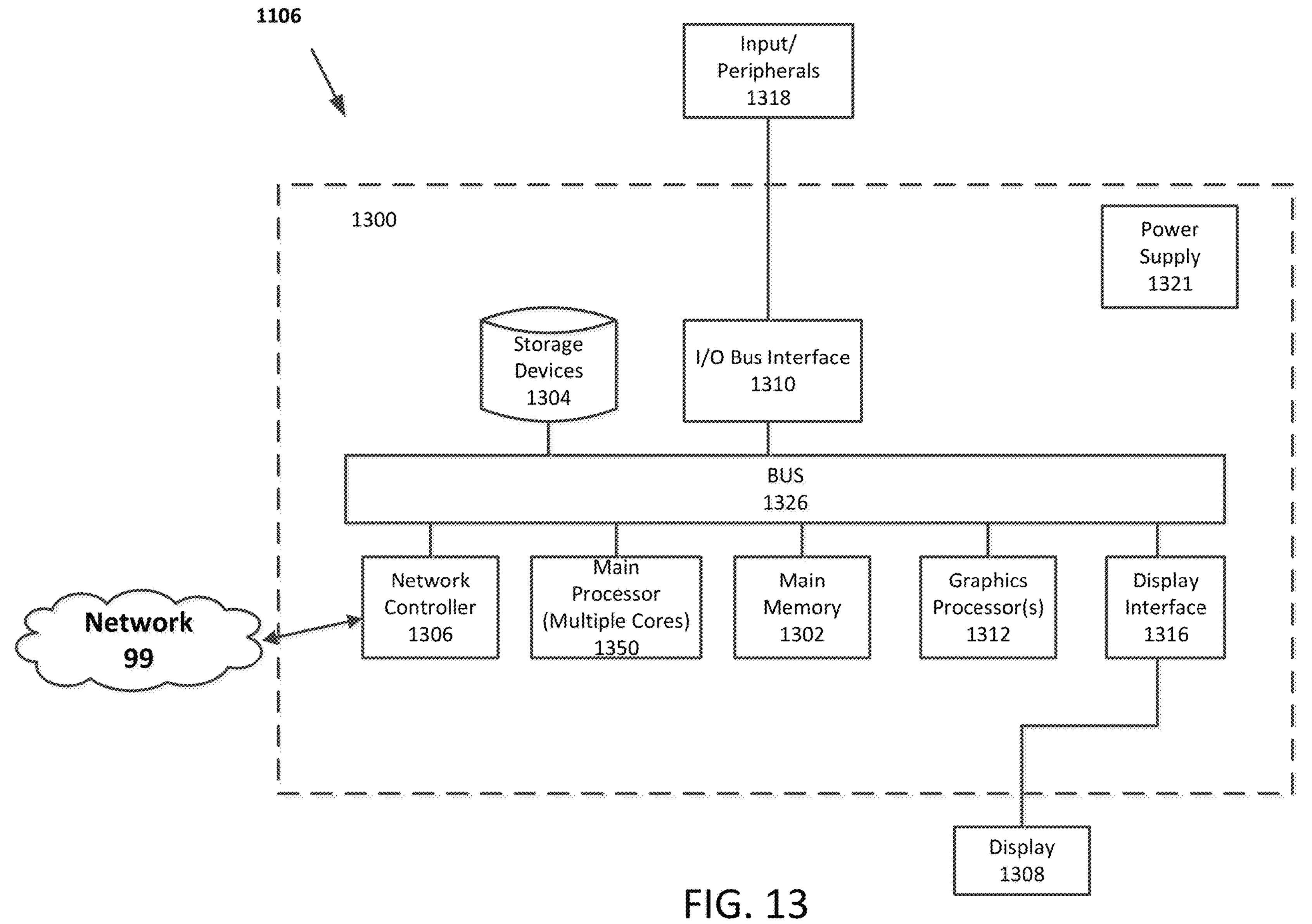
FIG. 13 is a block diagram illustrating an example computer system 1106 for implementing the blockchain and virtual reality methods, according to an exemplary aspect of the disclosure.

FIG. 13 is a block diagram illustrating an example computer system 1106 for implementing the blockchain and virtual reality methods. The computer system may be a laptop computer or workstation running an operating system, for example Ubuntu Linux OS, Windows, a version of Unix OS, or Mac OS. The computer system 1300 may include one or more central processing units (CPU) 1350 having multiple cores. The computer system 1300 may include a graphics board 1312 having multiple GPUs, each GPU having GPU memory. The graphics board 1312 may perform many of the mathematical operations of the disclosed blockchain and virtual reality methods. The computer system 1300 includes main memory 1302, typically random access memory RAM, which contains the software being executed by the processing cores 1350 and GPUs 1312, as well as a non-volatile storage device 1304 for storing data and the software programs. Several interfaces for interacting with the computer system 1300 may be provided, including an I/O Bus Interface 1310, Input/Peripherals 1318 such as a keyboard, touch pad, mouse, Display Adapter 1316 and one or more Displays 1308, and a Network Controller 1306 to enable wired or wireless communication through a network 99. The interfaces, memory and processors may communicate over the system bus 1326. The computer system 1300 includes a power supply 1321, which may be a redundant power supply.

In some embodiments, the computer system 1300 may include a CPU and a graphics card by NVIDIA, in which the GPUs have multiple CUDA cores.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A decentralized metaverse security system for managing entity access, comprising:

a head-mounted display device for metaverse engagement;

a virtual environment within the metaverse;

a blockchain layer featuring a smart contract for secure access management, wherein the smart contract's data model relies on three core data structures: Entity, Certificate, and trust entity, wherein serving as a central hub between digital identities of entities and a distributed application (dApp), the Smart Contract regulates data flow based on predefined rules;

a business layer, linked to the blockchain layer, for transaction processing via the smart contract, wherein the business layer adopts a hierarchical trust model to foster trust among parties;

a communication layer, connected to the business layer, utilizing an API web service for communication, including establishing web connections to the blockchain layer through the API, enabling information retrieval from the smart contract for user verification; and an application layer, positioned as a top-level layer, facilitating the connection of the distributed application (dApp) and virtual environment to the blockchain layer via the communication layer during operational phases, wherein during a user registration process, upon receiving a username and a password provided by a new user at a mobile device, a unique wallet address is created as an identifier of the user within the decentralized metaverse security system, a private-public key pair is generated for the user, the wallet address and the private-public key pair are stored at the mobile device after being encrypted using the password, and the private-public key pair is generated by: (1) deriving, as a seed, a randomly selected 12-word keyphrase from a wordlist that consists of 2048 words, (2) generating a 256-bit private key based on the derived seed using Elliptic Curve Cryptography, and (3) generating a corresponding public key based on the 256-bit private key, wherein during a user identity verification process, upon receiving from the user an interaction request to initiate an interaction with the virtual environment, a two-tiered verification is performed, which comprises: (1) a trustworthiness assessment, in which it is determined, based on the wallet address, whether the user is a registered entity within the decentralized metaverse security system, and (2) an authenticity validation, in which it is determined whether the interaction request is authenticated by a trusted entity, and the trusted entity is a registered entity that is both identified by the interaction request and listed in a white list of entities trusted by a provider of the metaverse.

2. The system of claim 1, wherein the distributed application (dApp) initiates signing requests, determining handling of user assets, wherein the API serves as a conduit, transmitting signed transactions to other nodes within the blockchain layer.

3. The system of claim 1, wherein the metaverse incorporates a login function, wherein the function establishes web connections to the blockchain layer through the API, enabling information retrieval from the smart contract for user verification, wherein verification process includes obtaining a signature for the user's wallet address.

4. The system of claim 1, wherein the smart contract features a certificate get logic function, wherein the function retrieves a signed message, issue date, and expiration date of a given certificate associated with a specific address, wherein a sign certificate logic function interacts with the distributed application (dApp), allowing trusted entities to issue new certificates with defined expiration dates.

5. The system of claim 1, wherein the blockchain layer retains results from an attestation process, wherein the attestation process involves a trusted entity providing their signature for the entity providing a certificate, affirming the certificate's authenticity, wherein the process creates a robust trust web, confirming that an entity's claim is corroborated by multiple trusted parties within the blockchain layer.

6. The system of claim 1, wherein the distributed application examines a user-provided wallet address and cross-references the wallet address with smart contract records to confirm the user's registration.

7. The system of claim 6, wherein upon validation of the wallet address, the distributed application prompts the user for a verifiable claim, obtains a relevant claim from the smart contract, and compares the verifiable claim to the obtained relevant claim to verify its authenticity.

8. The system of claim 1, wherein the distributed application includes an input for receiving a trusted party claiming to be an issuer of a certificate.

9. The system of claim 1, wherein the distributed application includes an input for receiving a certificate, including inputting an event that the user wishes to enter, associating the certificate and event with a unique wallet address, and storing the certificate, event, and wallet address on the blockchain.

10. The system of claim 1, wherein the head-mounted display device is configured to initiate access to a metaverse event, including a verification interface for inputting an event name, hostname, and a unique wallet address.

11. A method for managing entity access in a decentralized metaverse security system, the decentralized metaverse security system comprising a head-mounted display device for metaverse engagement, a virtual environment within the metaverse, a blockchain layer featuring a smart contract for secure access management, wherein the smart contract's data model relies on three core data structures: Entity, Certificate, and trust entity, wherein serving as a central hub between digital identities of entities and a distributed application (dApp), the Smart Contract regulates data flow based on predefined rules, a business layer linked to the blockchain layer, for transaction processing via the smart contract, wherein the business layer adopts a hierarchical trust model to foster trust among parties, a communication layer connected to the business layer, utilizing an API web service for communication, including establishing web connections to the blockchain layer through the API, enabling information retrieval from the smart contract for user verification, and an application layer positioned as a top-level layer, facilitating the connection of the distributed application (dApp) and virtual environment to the blockchain layer via the communication layer during operational phases, the method comprising:

during a user registration process, receiving a username and a password provided by a new user at a mobile device, creating a unique wallet address for the user, as an identifier of the user within the decentralized metaverse security system, generating a private-public key pair for the user by: (1) deriving, as a seed, a randomly selected 12-word keyphrase from a wordlist that consists of 2048 words, (2) generating a 256-bit private key based on the derived seed using Elliptic Curve Cryptography, and (3) generating a corresponding public key based on the 256-bit private key, and encrypting the wallet address and the private-public key pair using the password and storing the encrypted wallet address and private-public key pair at the mobile device, and during a user identity verification process, receiving from the user an interaction request to initiate an interaction with the virtual environment, performing a two-tiered verification by performing (1) a trustworthiness assessment, in which it is determined, based on the wallet address, whether the user is a registered entity within the decentralized metaverse security system, and (2) an authenticity validation, in which it is determined whether the interaction request is authenticated by a trusted entity, wherein the trusted entity is a registered entity that is both identified by the interaction request and listed in a white list of entities trusted by a provider of the metaverse.

12. The method of claim 11, wherein the trusted entity authenticates the interaction request through a digital signature generated using an Elliptic Curve Digital Signature algorithm.

13. The method of claim 11, wherein the smart contract is deployed in the blockchain layer using Solidity.

14. The method of claim 11, wherein the API web service is Infura API web service.

15. The method of claim 11, wherein the metaverse is hosted in Oculus.

16. The method of claim 11, wherein the predefined rules are based on an Ethereum protocol.

17. The method of claim 11, wherein the user identity verification process is initiated when the user initiates access to a metaverse event using the head-mounted display device.

* * * * *